United States Patent
Merrell

(10) Patent No.: US 10,756,413 B2
(45) Date of Patent: *Aug. 25, 2020

(54) DYNAMIC ANTENNA PLATFORM OFFSET CALIBRATION

(71) Applicant: Viasat, Inc., Carlsbad, CA (US)

(72) Inventor: Douglas J. Merrell, Buford, GA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,619

(22) Filed: Aug. 22, 2019

(65) Prior Publication Data

US 2020/0052365 A1 Feb. 13, 2020

Related U.S. Application Data

(63) Continuation of application No. 16/229,470, filed on Dec. 21, 2018, now Pat. No. 10,446,906, which is a (Continued)

(51) Int. Cl.
*H01Q 1/42* (2006.01)
*H01Q 1/12* (2006.01)
(Continued)

(52) U.S. Cl.
CPC ........... *H01Q 1/1257* (2013.01); *H01Q 1/288* (2013.01); *H01Q 1/42* (2013.01); *H01Q 3/08* (2013.01);
(Continued)

(58) Field of Classification Search
CPC ......... H01G 1/1257; H01G 1/288; H01G 3/08
See application file for complete search history.

(56) References Cited

U.S. PATENT DOCUMENTS 5,587,714 A 12/1996 Chu et al.
5,809,457 A 9/1998 Yee et al.
(Continued)

FOREIGN PATENT DOCUMENTS

EP 1703352 A1 9/2006
GB 2460161 A 11/2019
(Continued)

OTHER PUBLICATIONS

PCT International Search Report and Written Opinion, International Application No. PCT/US2018/040770, dated Jul. 3, 2018, 10 pgs.

*Primary Examiner* — Graham P Smith
(74) *Attorney, Agent, or Firm* — Holland & Hart LLP

(57) ABSTRACT

Systems and methods are described for supporting dynamic antenna platform offset calibration for an antenna system mounted to a mobile vehicle. In particular, dynamic antenna platform offset calibration can be performed while communicating user data associated with the mobile vehicle (e.g., based at least in part on alignment calibration procedures including measurements of user data signals), with an antenna platform offset being updated when alignment calibration procedures have been performed at suitably separated spatial conditions. Accordingly, antenna platform offset calibration may be performed throughout the operation of the mobile vehicle without requiring that the vehicle be proactively aligned in a particular orientation for a dedicated calibration routine prior to using the antenna for communicating user data during normal operation of the mobile vehicle.

20 Claims, 7 Drawing Sheets

Related U.S. Application Data continuation of application No. 15/642,808, filed on Jul. 6, 2017, now Pat. No. 10,211,508.

(51) Int. Cl.
    *H01Q 1/28*     (2006.01)
    *H01Q 3/08*     (2006.01)
    *H04B 7/185*     (2006.01)
    *H01Q 1/18*     (2006.01)

(52) U.S. Cl.
    CPC ........... *H04B 7/18545* (2013.01); *H01Q 1/18* (2013.01); *H01Q 1/28* (2013.01)

(56) References Cited

U.S. PATENT DOCUMENTS

| | | |
|---|---|---|
| 6,377,211 B1 | 4/2002 | Hsiung |
| 6,393,255 B1 | 5/2002 | Lane |
| 6,567,040 B1 | 5/2003 | Sevaston |
| 6,657,588 B2 | 12/2003 | Strickland et al. |
| 7,009,558 B1 | 3/2006 | Fall et al. |
| 7,095,376 B1 | 8/2006 | Timothy et al. |
| 7,218,273 B1 | 5/2007 | Webster et al. |
| 7,346,452 B2 | 3/2008 | Ford et al. |
| 7,437,222 B2 | 10/2008 | Liu et al. |
| 7,663,542 B1 | 2/2010 | Goodzeit et al. |
| 8,730,115 B2 | 5/2014 | Yeshanov et al. |
| 2004/0119640 A1 | 6/2004 | Menegozzi et al. |
| 2008/0068927 A1 | 3/2008 | Pillon |
| 2008/0281555 A1 | 11/2008 | Godin et al. |
| 2010/0188304 A1 | 7/2010 | Clymer et al. |
| 2011/0304736 A1 | 12/2011 | Evans |
| 2015/0011159 A1 | 1/2015 | Marinov et al. |
| 2015/0200449 A1 | 7/2015 | Sleight et al. |

FOREIGN PATENT DOCUMENTS

| | | |
|---|---|---|
| JP | 07-122925 | 5/1995 |
| WO | WO 20110304736 A1 | 11/2003 |
| WO | WO 2011-053161 | 5/2011 |
| WO | WO 2019-010213 A1 | 1/2019 |

DYNAMIC ANTENNA PLATFORM OFFSET CALIBRATION

CROSS REFERENCES

The present Application for patent is a Continuation of U.S. patent application Ser. No. 16/229,470 by MERRELL, entitled "Dynamic Antenna Platform Offset Calibration" filed Dec. 21, 2018, which is a Continuation of U.S. patent application Ser. No. 15/642,808 by MERRELL, entitled "Dynamic Antenna Platform Offset Calibration," filed Jul. 6, 2017, assigned to the assignee hereof, and expressly incorporated herein.

BACKGROUND

The present disclosure relates generally to satellite communications, and more specifically to systems and methods for dynamic antenna platform offset calibration.

An Earth-based antenna terminal for communication with a satellite typically has high antenna gain and a narrow beam pointed at the satellite, because of the large distance to the satellite and to avoid interference with other satellites. Mobile terminals on mobile vehicles may include an antenna system having a positioner to maintain pointing (or tracking) of the beam of the antenna system at the satellite during movement of the mobile vehicle.

Pointing error (e.g., misalignment) between a direction of maximum gain of the beam of the antenna and the actual direction from the antenna to the satellite can have a detrimental effect on the quality of the communication link between the antenna and the satellite. Relatively small misalignment may be compensated for by reducing a modulation and coding rate of signals communicated between the antenna system and the satellite. However, to maintain a given data rate (e.g., bits-per-second (bps)), this approach may increase system resource usage and thus result in inefficient use of the resources. Pointing error can also be associated with challenges in ensuring compliance with interference requirements with other satellites that are imposed by regulatory agencies (e.g., Federal Communications Commission (FCC), International Telecommunication Union (ITU), etc.) and/or a coordination agreement with operators of the other satellites.

Pointing error associated with an antenna system mounted to a mobile vehicle may result from misalignment between a sensor (e.g., an inertial reference unit (IRU)) of the mobile vehicle and the antenna system (e.g., a mounting platform of the antenna system), which may be referred to as antenna platform misalignment. Antenna platform misalignment may be caused by manufacturing tolerances between the sensor and the antenna system, structural deflections caused by movement and other disturbances, and other factors. In order to compensate for pointing error, whether associated with antenna platform misalignment or other factors, the mobile antenna terminal may perform a signal-based mispointing correction operation such as peaking, conical scan, sine scan, and similar methods. However, mispointing correction operations may not properly correct for antenna platform misalignment in all beam directions. Further, the mispointing correction operations may require a dedicated calibration routine that inhibits user communications, and may require the mobile vehicle to be pointed in orientations associated with the calibration routine.

SUMMARY

In one embodiment, a method is described for providing dynamic antenna platform offset calibration. The method includes communicating, at a mobile vehicle according to a first tracking mode during one or more travel segments of the mobile vehicle, first user data with a target satellite via a beam of an antenna mounted to the mobile vehicle, wherein communicating the first user data according to the first tracking mode includes performing an alignment calibration procedure to determine an antenna pointing offset based at least in part on a difference between an estimated pointing direction from the antenna to the target satellite that is determined based at least in part on positional information of the mobile vehicle and a peaked pointing direction from the antenna to the target satellite that is determined based at least in part on a measured signal characteristic of the first user data communicated during the alignment calibration procedure. In some examples, communicating the first user data according to the first tracking mode may also include pointing the beam of the antenna towards the target satellite for subsequent communication of the first user data based at least in part on the positional information of the mobile vehicle and the determined antenna pointing offset. The method includes repeating the alignment calibration procedure until determining that the alignment calibration procedure has been performed for a plurality of spatial conditions that satisfy a spatial separation criteria, and determining, for each of the calibration procedures performed for the plurality of spatial conditions, a respective calibration vector set based at least in part on the respective peaked pointing direction associated with the respective one of the plurality of spatial conditions. The method also includes determining, based at least in part on determining that the alignment calibration procedure has been performed for the plurality of spatial conditions that satisfy the spatial separation criteria, an antenna platform offset between a reference frame of the antenna and a reference frame of the mobile vehicle based at least in part on the calibration vector sets determined for each of the calibration procedures performed for the plurality of spatial conditions, and communicating, subsequent to the determining of the antenna platform offset, second user data with the target satellite via the beam of the antenna according to a second tracking mode, wherein communicating the second user data according to the second tracking mode comprises pointing the beam of the antenna towards the target satellite for communicating the second user data based at least in part on the positional information of the mobile vehicle and the determined antenna platform offset.

The foregoing has outlined rather broadly the features of an example according to the disclosure in order that the detailed description that follows may be better understood. Additional features and advantages will be described hereinafter. The conception and specific examples disclosed may be readily utilized as a basis for modifying or designing other methods or apparatuses for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems and methods are described herein for supporting dynamic antenna platform offset calibration for an antenna system mounted to a mobile vehicle. In particular, aspects of dynamic antenna platform offset calibration in accordance with the present disclosure can be performed while communicating user data associated with the mobile vehicle (e.g., based at least in part on alignment calibration procedures including measurements of user data signals), with an antenna platform offset being updated when alignment calibration procedures have been performed at suitably separated spatial conditions. Accordingly, antenna platform offset calibration in accordance with the present disclosure may be performed throughout the operation of the mobile vehicle without requiring that the vehicle be proactively aligned in a particular orientation for a dedicated calibration routine prior to using the antenna for communicating user data during normal operation of the mobile vehicle.

This description provides examples, and is not intended to limit the scope, applicability or configuration of embodiments of the principles described herein. Rather, the following description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
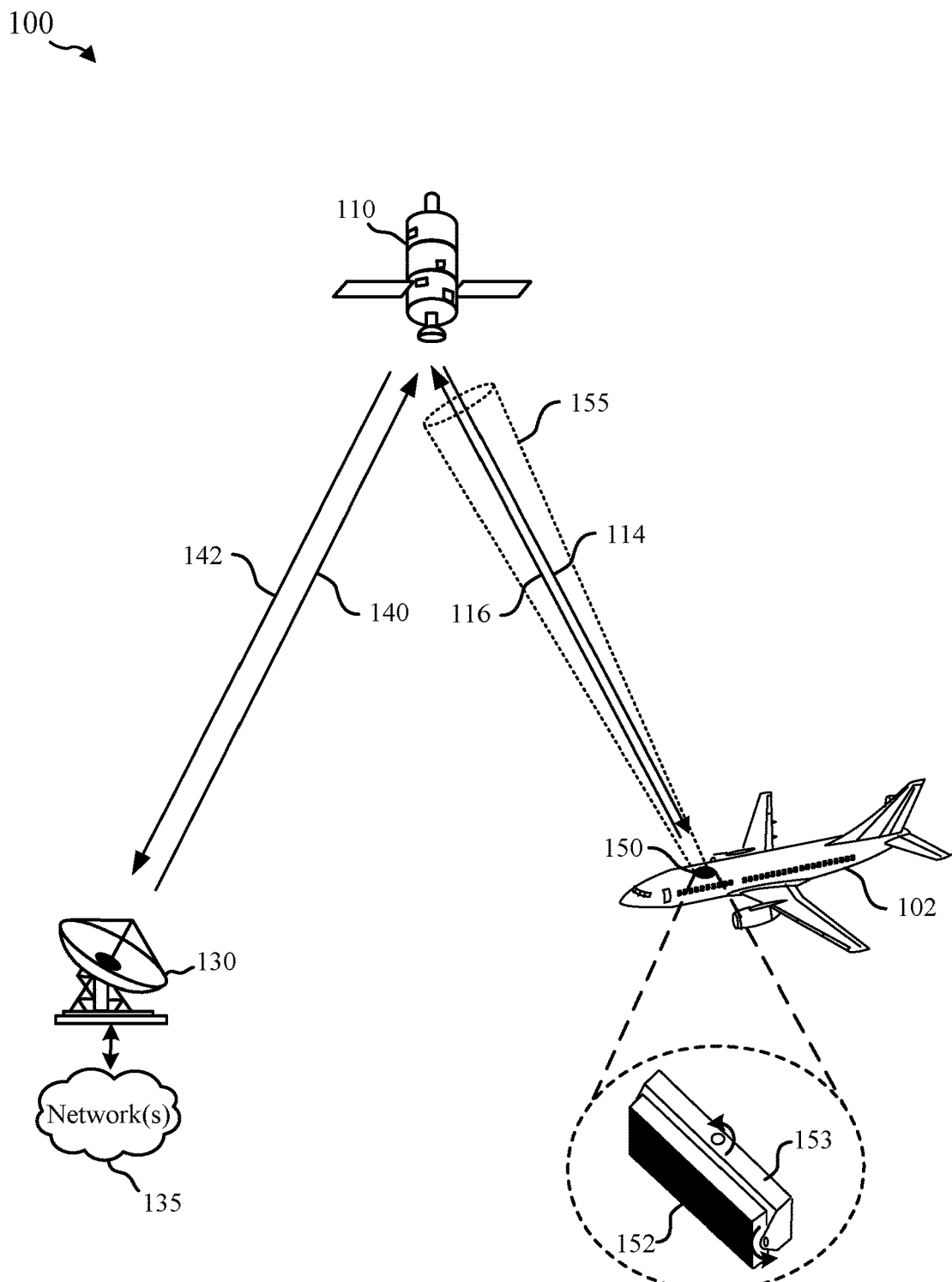
FIG. 1 illustrates an example satellite communications system that supports dynamic antenna platform offset calibration in accordance with aspects of the present disclosure.

FIG. 1 illustrates an example satellite communications system 100 that supports dynamic antenna platform offset calibration in accordance with aspects of the present disclosure. The satellite communications system 100 includes a mobile vehicle 102 having an antenna system 150 that supports wireless communications with a satellite (e.g., a target satellite 110). Other configurations for supporting dynamic antenna platform offset calibration may have more or fewer components than the satellite communications system 100 of FIG. 1.

In the illustrated embodiment, the target satellite 110 provides bidirectional communication between the mobile vehicle 102 and a gateway terminal 130. The gateway terminal 130 may be referred to as a hub or ground station. The gateway terminal 130 includes an antenna that supports transmitting forward uplink signals 140 to the target satellite 110 and receiving return downlink signals 142 from the target satellite 110. The gateway terminal 130 can also schedule traffic communicated via the antenna system 150. Alternatively, the scheduling can be performed in other parts of the satellite communications system 100 (e.g., a core node, or other components, not shown). Forward uplink signals 140 and/or return downlink signals 142 communicated between the gateway terminal 130 and the target satellite 110 can use the same, overlapping, or different frequencies as the forward downlink signals 114 and/or return uplink signals 116 communicated between the target satellite 110 and the antenna system 150.

The gateway terminal 130 can be provided as an interface between a network 135 and the target satellite 110. The gateway terminal 130 can be configured to receive data and information directed to the antenna system 150 from a source accessible via the network 135. The gateway terminal 130 can format the data and information and transmit forward uplink signals 140 to the target satellite 110 for delivery to the antenna system 150. Similarly, the gateway terminal 130 can be configured to receive return downlink signals 142 from the target satellite 110 (e.g., containing data and information originating from the antenna system 150) that is directed to a destination accessible via the network 135. The gateway terminal 130 can also format the received return downlink signals 142 for transmission on the network 135.

The network 135 can be any type of network and can include for example, the Internet, an IP network, an intranet, a wide area network (WAN), a virtual LAN (VLAN), a fiber optic network, a cable network, a public switched telephone network (PSTN), a public switched data network (PSDN), a public land mobile network, and/or any other type of network supporting communication between devices as described herein. The network 135 can include both wired and wireless communications links as well as optical links. The network 135 can connect multiple gateway terminals 130 that can be in communication with target satellite 110 and/or with other satellites.

The target satellite 110 can receive the forward uplink signals 140 from the gateway terminal 130 and transmit corresponding forward downlink signals 114 to the antenna system 150. The target satellite 110 can also receive return uplink signals 116 from the antenna system 150 and transmit corresponding return downlink signals 142 to the gateway terminal 130. The target satellite 110 can operate in a multiple spot beam mode, transmitting and receiving a number of narrow beams directed to different regions on Earth. Alternatively, the target satellite 110 can operate in wide area coverage beam mode, transmitting one or more wide area coverage beams. In various embodiments the target satellite 110 may be a geostationary satellite or a non-geostationary satellite, such as a low earth orbit (LEO) or medium earth orbit (MEO) satellite. Although only a single target satellite 110 is shown in the satellite communications system 100, other communications system may have more than one target satellite 110, and the more than one target satellites 110 may support various operations of unidirectional or bidirectional communications, including the operations of dynamic antenna platform offset calibration described herein.

The target satellite 110 can be configured as a "bent pipe" satellite that performs frequency and polarization conversion of the received signals before retransmission of the signals to their destination. As another example, the target satellite 110 can be configured as a regenerative satellite that demodulates and remodulates the received signals before retransmission.

The antenna system 150 is mounted on the mobile vehicle 102, which is an airplane in the illustrated example. More generally, an antenna system 150 can be mounted on various types of mobile vehicles 102 such as aircraft (e.g., airplanes, helicopters, drones, blimps, balloons, etc.), trains, automobiles (e.g., cars, trucks, busses, etc.), watercraft (e.g., private boats, commercial shipping vessels, cruise ships, etc.) and others.

In some embodiments described herein the antenna system 150 is used for bidirectional (two-way) communication with the target satellite 110. In other embodiments, the antenna system 150 may be used for unidirectional communication with the target satellite 110, such as a receive-only implementation (e.g., receiving satellite broadcast television). Although only one antenna system 150 is illustrated in FIG. 1, other satellite communications systems that support dynamic antenna platform offset calibration may include more than one mobile vehicle 102 having an antenna system 150, or one or more mobile vehicles 102 having more than one antenna system 150.

The antenna system 150 includes an antenna 152 associated with a beam 155 that supports communication between the mobile vehicle 102 and the target satellite 110. In the illustrated embodiment, the antenna 152 includes an array of waveguide antenna elements arranged in a rectangular panel. Each of the antenna elements can include a waveguide-type feed structure including a horn antenna. Alternatively, the antenna 152 may be a different type of antenna, such as a reflector antenna, a phased array antenna, a slot array antenna, etc.

The beam 155 of antenna 152 that is pointed towards the target satellite 110 has sufficient antenna gain in the direction of the target satellite 110 to permit communication of one or more signals. The communication can be bidirectional (e.g., by the antenna 152 transmitting a signal to the target satellite 110 and also receiving a signal from the target satellite 110) or unidirectional (e.g., the antenna 152 either transmitting a signal to the target satellite 110 or receiving a signal from the target satellite 110, but not both).

The antenna system 150 also includes a positioner 153 for pointing the beam 155 towards the target satellite 110 (e.g., along an estimate of an aligned direction from the antenna 152 to the target satellite 110, which may be referred to a satellite look angle) using the techniques described herein.

In the example of antenna system 150, the positioner 153 includes an alignment mechanism responsive to a control signal from an antenna control unit (ACU) (not shown) to provide pointing of the beam 155 towards the target satellite 110 about two rotational degrees of freedom (e.g., elevation and azimuth). In some examples the antenna 152 may include a phased array of antenna elements, and a positioner 153 for pointing the beam 155 towards the target satellite 110 may include an electronic beamformer (not shown) that forms the beam 155 via the phased array of antenna elements by applying phase and/or amplitude shifting of signals communicated by respective antenna elements of the phased array. In some examples in accordance with the present disclosure, an antenna system 150 may include one or more positioners 153 that collectively provide both a mechanical positioning and an electronic beamforming.

Based on the location of the target satellite 110, the location of the mobile vehicle 102, and the attitude (e.g., yaw, roll, and pitch) of the mobile vehicle 102, the ACU of the antenna system 150 may determine and provide a control signal to the positioner 153 to maintain pointing of the beam 155 at the target satellite 110 as the mobile vehicle 102 and/or the target satellite 110 moves. In some cases, the direction of maximum gain of the beam 155 may be aligned with the direction of the target satellite 110. Alternatively, the gain of the beam 155 in the direction from the antenna 152 to the target satellite 110 may be less than the maximum gain of the beam 155, due to the direction of maximum gain being aligned in a direction different from the direction to the target satellite 110. In various examples the misalignment may be due to pointing accuracy limitations of the antenna 152, offsets in sensors of the mobile vehicle 102, offsets of the antenna system 150, or an antenna platform misalignment (e.g., an alignment difference between a sensor of the mobile vehicle 102 and the antenna system 150). The difference between the direction of maximum gain of the beam 155 and the direction from the antenna 152 to the target satellite 110 is referred to herein as the pointing error.

In accordance with aspects of the present disclosure, the antenna system 150 (e.g., as directed by an alignment calibration controller) may perform alignment calibration procedures associated with different spatial conditions while the antenna system 150 is communicating user data during travel segments of the mobile vehicle 102. The alignment calibration procedures at the different spatial conditions may be used to determine an antenna platform offset in order to compensate for antenna platform misalignment. As used herein, a spatial condition may refer to a spatial position and/or orientation of the antenna 152, the mobile vehicle 102, or both. For example, a spatial condition may refer to one or more of an antenna azimuth direction, an antenna elevation direction, a mobile vehicle heading (e.g., yaw angle), a mobile vehicle roll angle, a mobile vehicle pitch orientation, a relative position between an antenna 152 and a mobile vehicle 102, or others. The alignment calibration controller may determine the antenna platform offset based on the alignment calibration procedures for the different spatial conditions when the different spatial conditions collectively satisfy a spatial separation criteria.

An alignment calibration procedure in accordance with the present disclosure may include sweeping the beam 155 in different directions while communicating with the target satellite 110, and measuring a signal characteristic associated with the communications at the different directions. By sweeping the beam 155 in different directions while communicating with the target satellite 110, the alignment calibration controller can determine an orientation of the beam 155 associated with a peak value of the measured signal characteristic.

For example, the alignment calibration controller may first estimate an aligned pointing direction from the antenna 152 to the target satellite 110 based on the location of the antenna 152 (e.g., provided as an approximation from a GPS location of the antenna system 150 or from a GPS location of another point of the mobile vehicle 102), the location of the target satellite 110 (e.g., as provided by a previously determined orbital position and stored at the mobile vehicle 102, from a location signal received from the target satellite 110 or some other source, or from a value calculated by the ACU based on an understood orbital path of the target satellite 110), and the attitude of the mobile vehicle 102 (e.g., as provided by the inertial reference unit (IRU) of the mobile vehicle 102). In some examples the location of the antenna 152 or the attitude of the mobile vehicle 102 may be referred to as positional information of the mobile vehicle 102. To support the alignment calibration procedure, the ACU may then determine misaligned directions that are different from the estimated aligned direction (e.g., as offset from the aligned direction by an angular increment), and cause the beam 155 to be pointed in the misaligned directions during communications with the target satellite 110. The antenna system 150, or some other supporting component (e.g., a modem) may measure a signal characteristic (e.g., a signal strength or a signal quality) of user data communicated at the respective misaligned directions of the beam 155.

In other examples of an alignment calibration procedure in accordance with the present disclosure, the alignment calibration controller may cause incremental changes in orientation of the beam 155 (e.g., incremental changes in antenna azimuth and/or elevation) using the measured signal characteristic and without explicitly basing the pointing directions during the alignment calibration procedure on an estimate of the aligned direction determined from the location and attitude information. By omitting the estimation of an aligned direction, such alignment calibration procedures may not necessarily be based on the location of the antenna 152, the location of the target satellite 110, or the attitude of the mobile vehicle 102. Rather, such alignment calibration procedures may instead determine whether signal strength or signal quality associated with the communicated user data increased or decreased in response to the change in orientation of the beam 155 in order to determine a direction associated with a peak signal characteristic.

Accordingly, while supporting user data communications via the beam 155 of the antenna 152 at the misaligned directions (e.g., without requiring inhibiting transmissions of the antenna 152, or while receiving transmissions from the target satellite 110 via the antenna 152), the alignment calibration controller may measure, or receive a measurement of a signal strength or a signal quality for the respective misaligned directions, and determine a "peaked" direction associated with the highest signal strength or signal quality of the user data. The orientation of the beam 155 when peaked may be determined based on the output from an antenna positioning motor or sensors (e.g., positional or angular encoders associated with a positioning mechanism) used to assist in physically positioning the antenna 152 (e.g., directing the boresight of the antenna 152 to the target satellite 110), or by a beamformer used to form the beam 155 from a plurality of antenna elements of a phased array (e.g., a calculation of an orientation of the beam 155 used to determine signal phase and amplitude adjustments for forming the beam 155). For example, in one embodiment in which the antenna 152 is positioned using antenna positioning motors supporting motion in an azimuth direction and in an elevation direction, the azimuth and elevation that result in the antenna 152 receiving the strongest signal are used as the peaked orientation of the beam 155. The difference between the estimated aligned direction between the beam 155 and the target satellite 110 and the peaked direction between the beam 155 and the target satellite 110 may be calculated as an antenna pointing offset, which may then be applied to subsequent pointing operations (e.g., for subsequent communication of user data or for subsequent alignment calibration procedures) by the alignment calibration controller to more accurately orient the beam 155 towards the target satellite 110.

Although such peaking operations may provide suitable beam pointing calibration within a similar range of spatial conditions (e.g., a similar orientation of the beam 155 in an azimuth direction of the antenna 152), the antenna pointing offset may not be suitable for other spatial conditions of the antenna system 150 (e.g., other azimuth orientations of the beam 155 in the azimuth direction of the antenna 152). For example, the antenna system 150 may be installed with an antenna platform misalignment between the antenna system 150 and a sensor of the mobile vehicle 102 (e.g., an IRU of the mobile vehicle 102), which in some examples may correspond to rotational offsets between the sensor of the mobile vehicle 102 and the antenna system 150 (e.g., a roll offset, a pitch offset, and/or a yaw offset). Thus, an antenna platform misalignment may be associated with three or more degrees of freedom, whereas an alignment calibration procedure (e.g., a calibration procedure to compensate for an azimuth offset and an elevation offset of the antenna system 150 at a particular spatial condition) may only compensate for two degrees of freedom. Accordingly, when the antenna system 150 is installed on the mobile vehicle 102 with an antenna platform misalignment, a determined antenna pointing offset (e.g., an elevation offset and an azimuth offset) that improves antenna alignment at a given azimuth orientation of the beam 155 may degrade alignment of the beam 155 of the antenna 152 at a different azimuth orientation of the beam 155 (e.g., an opposite azimuth orientation of the beam 155).

Although alignment calibration procedures may be performed while communicating user data, the data rate supported by the antenna system 150 may be degraded while performing an alignment calibration procedure. For example, when pointing the beam 155 along the misaligned directions of an alignment calibration procedure, the gain of the antenna 152 may be reduced as a result of a lower gain portion of the beam 155 being aligned with the target satellite. Although the lower gain portion of the beam 155 may still support user data communication, the antenna system 150 may employ a reduced modulation and coding rate (e.g., a reduced modulation and coding scheme (MCS)) in order to provide reliable communication via the antenna 152 that is operating with the lower gain. Thus, in accordance with aspects of the present disclosure, the periodicity of performing alignment calibration procedures to support dynamic antenna platform offset calibration may be extended (e.g., performing alignment calibration procedures less often) upon determining and/or refining an antenna platform offset. Further, alignment calibration procedures to support dynamic antenna platform offset calibration may be scheduled more often when requested data rates are relatively low (e.g., when a reduced MCS would not impede the requested data rate), or may be scheduled less often or even postponed when requested data rates are relatively high (e.g., when a reduced MCS would impede the requested data rate).

In accordance with aspects of the present disclosure, a first tracking mode may be employed upon the mobile vehicle 102 entering service. The first tracking mode may track the target satellite 110 using positional information (e.g., a position of the target satellite 110, a position of the mobile vehicle 102, and an attitude of the mobile vehicle 102), and antenna pointing offsets determined from alignment calibration procedures conducted while communicating user data. For example, an estimated aligned pointing direction for the beam 155 may be determined based on the inertial reference information of the mobile vehicle 102, which may serve as the starting point or center point of an alignment calibration procedure that determines an antenna pointing offset for updating the estimated aligned pointing direction for the next alignment calibration procedure (which may immediately follow the previous one or be separated by a short period of pointing using the estimated aligned pointing direction).

As the alignment calibration procedures are performed at various spatial conditions, an alignment calibration controller may identify that the various spatial conditions meet a spatial separation criteria for applying the results of the alignment calibration procedures to determine the antenna platform misalignment (e.g., within calibration bins associated with different ranges of spatial conditions, which ensures a degree of spatial separation between the stored results of alignment calibration procedures associated with spatial conditions). Results from the alignment calibration procedure performed at each of the identified spatial conditions may be stored in memory (e.g., memory/storage associated with the alignment calibration controller), which may include a calibration vector set associated with the alignment calibration procedure for each of the identified spatial conditions. Upon alignment calibration procedures being performed during user data communications at a plurality of spatial conditions that satisfy a spatial separation criteria (e.g., satisfying a threshold distribution of azimuth directions of the antenna 152, or a threshold distribution of heading directions of the mobile vehicle 102), an antenna platform offset may be determined by the alignment calibration controller, based on the results from the alignment calibration procedures, to compensate for antenna platform misalignment. Subsequently, the antenna may be pointed (e.g., by the ACU) according to a second tracking mode that is based at least in part on the positional information of the mobile vehicle 102 and the determined antenna platform offset.

In various examples, the first tracking mode may be based at least in part on a "zero" antenna platform offset (e.g., assuming that the sensor of the mobile vehicle 102 and the antenna system 150 are installed in an aligned orientation with zero antenna platform misalignment, either as an explicit antenna platform offset having values of zero, or a lack of an antenna platform offset with empty or null values), a manual antenna platform offset (e.g., an antenna platform misalignment that was physically measured between the antenna system 150 and the mobile vehicle 102, or an antenna platform misalignment that was estimated based on a statistical distribution of antenna platform misalignments of multiple mobile vehicles 102, and stored at the ACU). Thus, the methods and apparatus described herein may support determining an initial antenna platform offset between the antenna system 150 and the mobile vehicle 102.

In various examples the antenna system 150 may continue performing alignment calibration procedures (e.g., as directed by the alignment calibration controller) during ongoing operation of the mobile vehicle 102 in the second tracking mode, and upon performing alignment calibration procedures at another set of spatial conditions that satisfy a spatial separation criteria, the alignment calibration controller may determine an updated antenna platform offset. In other words, the methods and apparatus described herein may also support providing ongoing refinement to the antenna platform offset between the antenna system 150 and the mobile vehicle 102.

The described operations may eliminate the need to perform a dedicated calibration routine for determining an antenna platform offset, including those where the mobile vehicle 102 is positioned in particular orientations, and may also eliminate the need to inhibit communications while performing calibration procedures to determine an antenna platform offset, because the alignment calibration procedures may be based at least in part on measurements performed on communicated user data.

Figure 2:
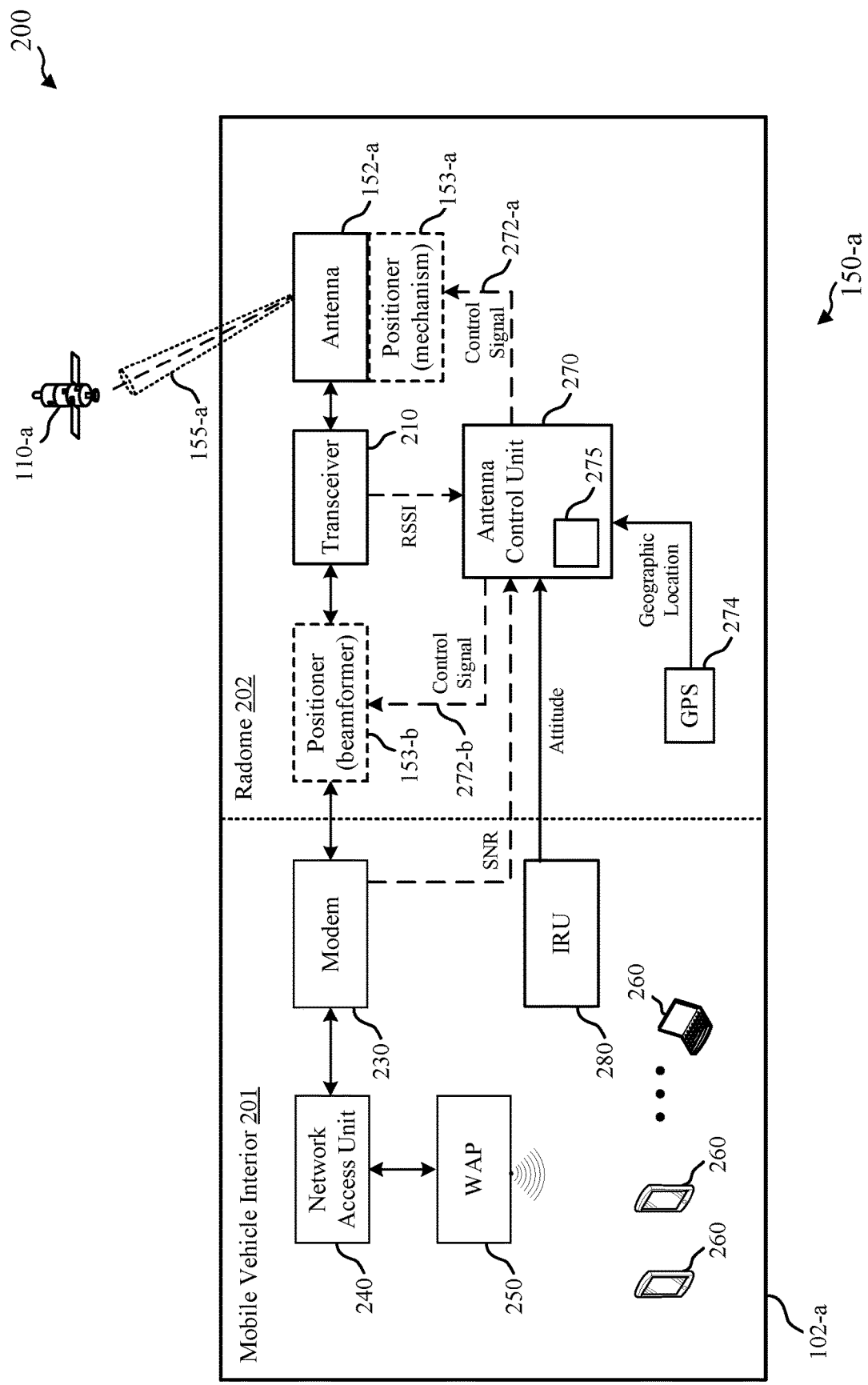
FIG. 2 is a block diagram illustrating an example of an antenna system mounted on a mobile vehicle for communications with a target satellite, that supports dynamic antenna platform offset calibration in accordance with aspects of the present disclosure.

FIG. 2 is a block diagram 200 illustrating an example of an antenna system 150-a mounted on a mobile vehicle 102-a for communications with a target satellite 110-a, that supports dynamic antenna platform offset calibration in accordance with aspects of the present disclosure. The antenna system 150-a, the mobile vehicle 102-a, and the target satellite 110-a may each be examples of the respective components described with reference to FIG. 1. In the illustrated example, the components of the antenna system 150-a are distributed between a mobile vehicle interior 201 and a radome 202 (e.g., mounted to the exterior of a mobile vehicle 102), and certain aspects of the operation of the antenna system 150-a may be managed by an ACU 270 (e.g., of the antenna system 150-a). Other configurations of an antenna system 150 that supports dynamic antenna platform offset calibration having more or fewer components than the example antenna system 150-a are possible, and the components may be arranged in different locations of the mobile vehicle 102-a. Moreover, the functionalities described herein can be distributed among the components in a different manner than described herein.

The antenna system 150-a includes an antenna 152-a that is housed under the radome 202, which may be disposed on the top of the body or other location (e.g., on the tail, etc.) of the mobile vehicle 102-a. The antenna 152-a is associated with a beam 155-a that may support transmission of a return uplink signal and/or reception of a forward downlink signal (e.g., return uplink signal 116 and/or forward downlink signal 114 as described with reference to FIG. 1) to support one-way or two-way data communication between a network and the mobile vehicle 102-a and/or data devices 260 associated with (e.g., within) the mobile vehicle 102-a. The data devices 260 can include mobile devices (e.g., smartphones, laptops, tablets, netbooks, and the like) such as personal electronic devices (PEDs) brought onto the mobile vehicle 102-a by passengers. In some examples, the data devices 260 can include a portion of the mobile vehicle 102-a itself, such as passenger seat-back systems or other devices on the mobile vehicle 102-a.

The data devices 260 can communicate with network access unit 240 via a communication link that can be wired or wireless. The communication links can be, for example, part of a local area network such as a wireless local area network (WLAN) supported by wireless access point (WAP) 250. One or more WAPs 250 can be distributed about the mobile vehicle 102-a, and can, in conjunction with network access unit 240, provide traffic switching or routing functionality. The network access unit 240 can also allow passengers to access one or more servers (not shown) local to the mobile vehicle 102-a, such as a server on an airplane that provides in-flight entertainment.

In operation, the network access unit 240 can provide uplink data received from the data devices 260 to modem 230 to generate modulated uplink data (e.g., a transmit intermediate frequency (IF) signal) for delivery to transceiver 210, where one or both of the modem 230 and the transceiver 210 may be a part of the antenna system 150-a, or otherwise interface with the antenna system 150-a. The transceiver 210 can upconvert and amplify the modulated uplink data to generate a return uplink signal (e.g., return uplink signal 116 described with reference to FIG. 1) for transmission to the target satellite 110-a via the antenna 152-a. The transceiver 210 can also receive a forward downlink signal (e.g., forward downlink signal 114 described with reference to FIG. 1) from the target satellite 110-a via the antenna 152-a. The transceiver 210 can amplify and downconvert the forward downlink signal to generate modulated downlink data (e.g., a receive IF signal) for demodulation by the modem 230. The demodulated downlink data from the modem 230 can then be provided to the network access unit 240 for routing to the data devices 260. The modem 230 can be integrated with the network access unit 240, or can be a separate component, in some examples. In the illustrated embodiment, the transceiver 210 is located outside the body of the mobile vehicle 102-a and under the radome 202. Alternatively, the transceiver 210 can be located in a different location, such as within the mobile vehicle interior 201.

In some examples the antenna system 150-a may include a positioner 153-a coupled to the antenna 152-a, which may be an example of a positioning mechanism for physically pointing the beam 155-a of the antenna 152-a. (e.g., when the direction of highest gain of the beam 155-a of the antenna 152-a is fixed relative to the aperture of the antenna 152-a). For example, the antenna 152-a may be a direct radiating two-dimensional array which results in an antenna boresight being normal to a plane containing the antenna elements of the array. As another example, the antenna 152-a may be a reflector antenna, and the feed elements and/or the reflector of the antenna 152-a can be mechanically steered by the positioner 153-a to point the beam 155-a at the target satellite 110-a. In some examples the positioner 153-a may be an elevation-over-azimuth (EL/AZ), two-axis positioner that provides adjustment of the beam 155-a in azimuth and elevation. In some examples the positioner 153-a may be a three-axis positioner to provide adjustment in azimuth, elevation, and skew. The positioner 153-a may be responsive to a control signal 272-a from ACU 270 to mechanically point the beam 155-a of the antenna 152-a in the direction of the target satellite 110-a as the mobile vehicle 102-a and/or the target satellite 110-a moves.

In some examples the antenna system 150-a may include a positioner 153-b coupled between the modem 230 and the transceiver 210, which may be an example of a beamformer for electronically directing the beam 155-a. For example, the antenna 152-a may be a non-movable, fully electronic scanned phased array antenna. In such a case, the positioner 153-a can include feed networks and phase controlling devices to properly phase signals communicated with some or all of the antenna elements of the antenna 152-a to steer the beam (e.g., in azimuth and elevation). The positioner 153-b may be responsive to a control signal 272-b from ACU 270 to electronically point the beam 155-a of the antenna 152-a in the direction of the target satellite 110-a as the mobile vehicle 102-a and/or the target satellite 110-a moves.

In some examples the antenna system 150-a may include both positioner 153-a and positioner 153-b. For example, the antenna 152-a may be an electro-mechanically steered array such as a variably inclined continuous transverse stub (VICTS) antenna, which may include one mechanical scan axis supported by the positioner 153-a, and one electrical scan axis supported by the positioner 153-b. Alternatively, the antenna system 150-a may include other positioners 153 that may vary from embodiment to embodiment, and may depend on the antenna type of the antenna 152-a.

Accordingly, the control signals 272-a and/or 272-b may adjust the angular direction of the beam 155-a depending on the manner in which the positioner(s) 153 are controlled, and can vary from embodiment to embodiment. Although only a single control signal 272 is illustrated for each of the positioners 153 shown in FIG. 2, "control signal," as used herein, can include one or more separate control signals provided by the ACU 270 to the respective positioner 153, which in turn may be provided on one or more signaling connections. For example, in some embodiments in which a positioner 153 adjusts the angular direction of the beam in multiple axes (e.g., azimuth and elevation), the control signal includes a control signal indicating the angular value of each axis. The functions of the ACU 270 can be implemented in hardware, instructions embodied in memory and formatted to be executed by one or more general or application specific processors, firmware, or any combination thereof.

During operation, as the mobile vehicle 102-a moves relative to the target satellite 110-a, the ACU 270 may provide control signal(s) 272-a and/or 272-b to positioner 153-a and/or positioner 153-b, respectively, to point the beam 155 of the antenna 152-a in the direction of the target satellite 110-a. The ACU 270 may determine the appropriate angular alignment based on the location of the target satellite 110-a, the location of the mobile vehicle 102-a, and the attitude (e.g., yaw, roll, and pitch) of the mobile vehicle 102-a. The ACU 270 may, for example, store or otherwise obtain data indicating the location of the target satellite 110-a. The geographic location of the mobile vehicle 102-a may, for example, be obtained via a global positioning system (GPS) 274 or other equipment associated with the mobile vehicle 102-a (e.g., from the IRU 280), including equipment located in the mobile vehicle interior 201, the radome 202, or any combination thereof. The attitude of the mobile vehicle 102-a may, for example, be provided via the IRU 280 of the mobile vehicle 102-a (e.g., as measured by a set of gyroscopes of the IRU 280), which in some examples may be referred to an inertial measurement unit (IMU). In some examples both the location and attitude of the mobile vehicle 102-a may be provided by a single component (e.g., performing the functions of both the IRU 280 and the GPS 274) that may be referred to as a position and attitude measuring device (PAMD).

To reduce pointing error associated with aligning beam 155-a with the target satellite 110-a, the ACU 270 may provide control signal 272-b and/or control signal 272-b in accordance with alignment calibration procedures (e.g., as directed by an alignment calibration controller 275) during the communication of user data for the data devices 260. Although the alignment calibration controller 275 is illustrated as part of the ACU 270 in the example of antenna system 150-a, in other examples of an antenna system 150 an alignment calibration controller 275 may be part of another component of an antenna system, such as part of a modem 230. In other examples, an alignment calibration controller 275 may be a standalone component of an antenna system 150. In yet other examples, the structures and/or instructions associated with an alignment calibration controller 275 may be distributed between two or more components of an antenna system 150 such as, for example, the ACU 270 and the modem 230.

The antenna system 150-a (e.g., as directed by the alignment calibration controller 275) may perform alignment calibration procedures associated with different spatial conditions while the antenna system 150-a is communicating user data during travel segments of the mobile vehicle 102-a. When it is determined (e.g., by the alignment calibration controller 275) that alignment calibration procedures have been performed for a set of spatial conditions that satisfy a spatial separation criteria, information from the alignment calibration procedures (e.g., calibration vector sets) may be used to determine an antenna platform offset, associated with the antenna platform misalignment between the mobile vehicle 102-a (e.g., the orientation of the IRU 280, or an adjusted output of the IRU 280) and the antenna 152-a (e.g., the reference frame of the antenna 152-a).

In various examples, the alignment calibration controller 275 may obtain a measured characteristic of the communicated user data to support the alignment calibration procedure performed at each of the set of spatial conditions. For example, the alignment calibration controller 275 may obtain a received signal strength indicator (RSSI), a signal strength indicator, a signal-to-noise ratio (SNR), or a combination thereof from the transceiver 210, the modem 230, or some other component indicating the signal characteristic of a forward downlink signal received by the antenna 152-a at various angular directions during a sweep or search performed by the alignment calibration procedure. Additionally or alternatively, the alignment calibration procedure may use the signal strength (or other signal metric) of a signal (e.g., the return uplink data signal) transmitted by the antenna 152-a to the target satellite 110-a at various angular directions during the sweep or search. In such an example, the alignment calibration controller 275 may obtain the value of the measured signal characteristic of the return uplink signal that was received by the target satellite 110-a from the gateway terminal (or other elements of a satellite communications system such as a core node, NOC, etc.) via the forward downlink signal, or the alignment calibration controller 275 may receive an indication of a portion of the return uplink signal associated with a peak signal characteristic measured elsewhere (e.g., at the target satellite 110-a or at a gateway terminal 130) that may be used by the alignment calibration controller 275 to determine the orientation of the beam 155-a upon the antenna 152-a transmitting the portion of the return uplink signal.

The alignment calibration controller 275 can then determine a peaked pointing direction for the beam 155-a (e.g., the angular orientation that directs the highest gain of the beam 155-a towards the target satellite 110-a) based on the measured signal characteristic at the various angular positions. The alignment calibration controller 275 may use a variety of techniques to determine the peaked pointing direction. For example, the alignment calibration controller 275 may fit the signal characteristic measurements to a 2-D or 3-D curve depending upon the correction profile of the alignment calibration procedure, and then determine the direction corresponding to the maximum signal metric (e.g., maximum signal strength or maximum SNR). Alternatively, other techniques may be used. The alignment calibration controller 275 can then determine an antenna pointing offset to improve pointing of the beam 155-a towards the target satellite 110-a, and may operate with the ACU 270 (e.g., updating the antenna pointing offset used by the ACU 270) to provide a control signal to the positioner 153-a and/or the positioner 153-b to adjust the orientation of beam 155-a towards the target satellite 110-a accordingly. The ACU 270 can provide further adjustments to the direction of the beam 155-a as the mobile vehicle 102-a moves relative to the target satellite 110-a, based at least in part on the antenna pointing offset determined by the respective alignment calibration procedure.

In accordance with aspects of the present disclosure, alignment calibration procedures, such as those described herein, may be performed for multiple spatial conditions (e.g., multiple azimuth orientations of the antenna 152-a, or multiple heading directions of the mobile vehicle 102-a) in a first tracking mode, where orientation of the beam 155-a at a given spatial condition may be based on positional information from the IRU 280 and/or GPS 274 (e.g., position of the target satellite 110-a, position of the mobile vehicle 102-a, and attitude of the mobile vehicle 102-a), and may also be based on an antenna pointing offset determined from an alignment calibration procedure. Upon performing alignment calibration procedures during user data communications at a set of spatial conditions that satisfy a spatial separation criteria (e.g., satisfying a threshold distribution of azimuth directions of the antenna 152-a, or a threshold distribution of heading directions of the mobile vehicle 102-a), an antenna platform offset may be determined based on the results of the alignment calibration procedures in order to compensate for antenna platform misalignment. Subsequently, the antenna may be pointed according to a second tracking mode that is based at least in part on the determined antenna platform offset.

Figure 3:
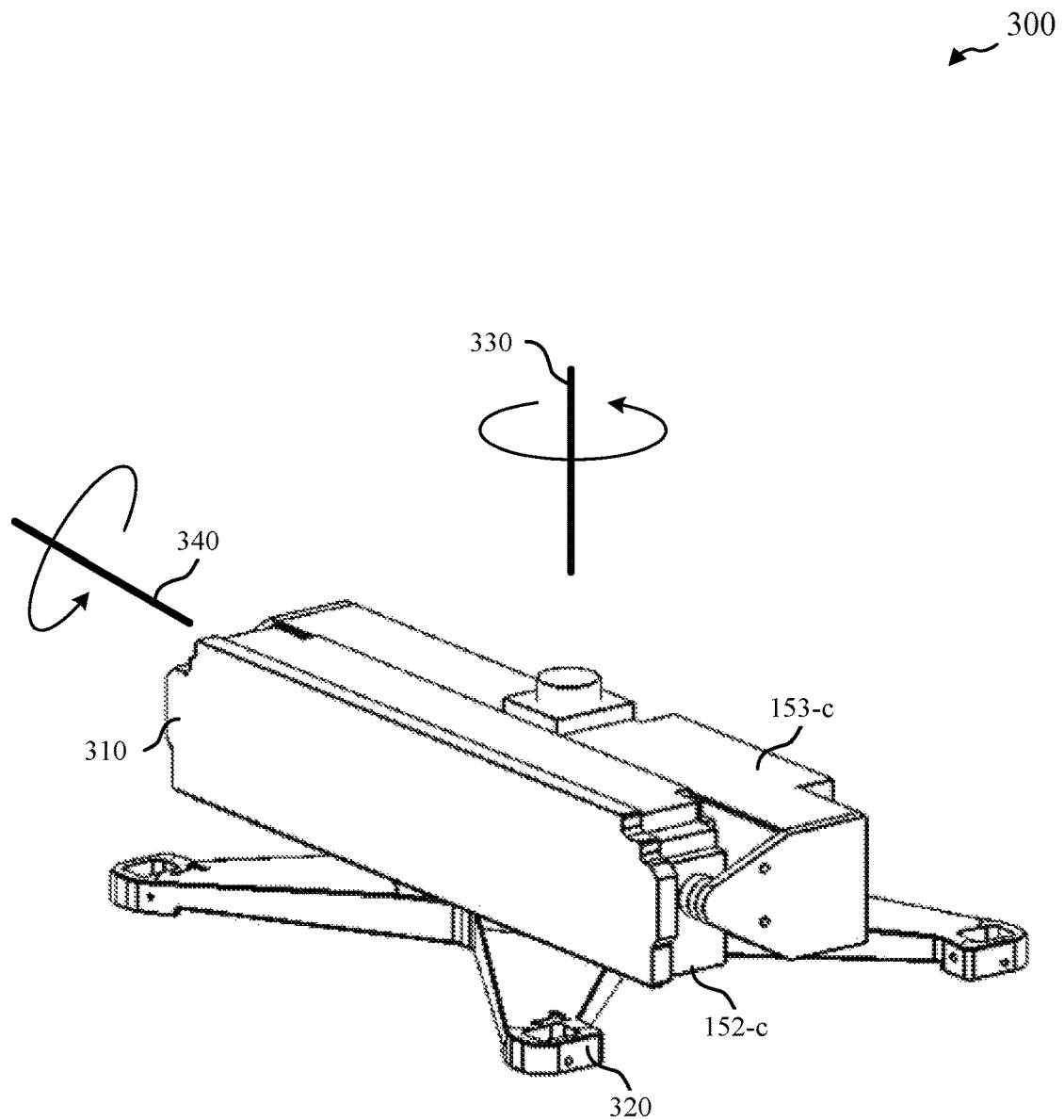
FIG. 3 illustrates perspective view of an example of an antenna and a positioner that supports dynamic antenna platform offset calibration in accordance with aspects of the present disclosure.

FIG. 3 illustrates perspective view of an example 300 of an antenna 152-c and a positioner 153-c (e.g., of an antenna system 150, not shown, which may be an example of an antenna system 150 described with reference to FIGS. 1 and 2) that supports dynamic antenna platform offset calibration in accordance with aspects of the present disclosure. In the example 300, the antenna 152-c includes an array 310 of antenna elements that may be a direct radiating two-dimensional array resulting in a boresight of the antenna 152-c being normal to a plane containing the antenna elements of the array 310. Alternatively, the array 310 of antenna elements can be arranged (e.g., in a non-planar arrangement) or fed (e.g., by a beamformer) in a different manner such that the direction of highest gain of the antenna 152-c is not normal to the antenna elements of the array 310. As mentioned above, in other embodiments in accordance with the present disclosure the antenna type of the antenna 152-c may be different.

The positioner 153-c may be responsive to control signals provided by an ACU 270 (e.g., as described with reference to FIG. 2) to point a beam 155 of the antenna 152-c towards a target satellite 110. In the illustrated embodiment, the positioner 153-c is an elevation-over-azimuth (EL/AZ) two-axis positioner that provides two-axis mechanical steering. The positioner 153-c includes a mechanical azimuth adjustment mechanism to point the beam 155 of the antenna 152-c about an azimuth axis 330, and a mechanical elevation adjustment mechanism to point the beam 155 of the antenna 152-c about an elevation axis 340. Each of the mechanical adjustment mechanisms may include a motor with gears and/or other elements to provide for movement of the antenna 152-c about the corresponding axis. As mentioned above, in other embodiments the components used to point the beam 155 of the antenna 152-c may be different.

The antenna 152-c may be mounted at a platform 320 to a mobile vehicle 102, where the platform 320 may be coupled between the mobile vehicle 102 and the positioner 153-c. The platform 320 may be associated with a reference frame (e.g., an antenna reference frame) from which the orientation of a beam 155 of the antenna 152-c is measured. In other words, the platform 320 may provide a reference frame from which beam orientation is based (e.g., in elevation and azimuth). In various examples, the mobile vehicle 102 that the antenna 152-c is mounted to may have a location provided for attaching the platform 320, such as a pattern of holes to accept mechanical fasteners for securing the platform 320 to the mobile vehicle 102.

The mounting location may be nominally prepared to provide a particular alignment between the platform 320 and a sensor (e.g., an IRU 280) of the mobile vehicle 102, such that the orientation of the beam 155 of the antenna 152-c may be provided with reference to the sensor of the mobile vehicle 102 (e.g., based at least in part on the measured roll, pitch, and yaw of the mobile vehicle 102). However, in various examples an antenna platform misalignment between the platform 320 and the sensor of the mobile vehicle 102 may result from manufacturing tolerances such as a planar skew of the mounting location for the platform 320, a planar skew of the surface of the platform 320 that mates with the mobile vehicle 102, hole size and/or positional variations associated with the platform 320 and or the mounting location of the mobile vehicle 102, size variations of the fasteners used to secure the platform 320 to the mobile vehicle 102, and/or other considerations. Further, in some examples antenna platform misalignment may occur as a result of deflections of the mobile vehicle 102 between the platform 320 and the sensor of the mobile vehicle 102. Such antenna platform misalignment may cause pointing errors when pointing a beam 155 of the antenna 152-c towards a target satellite 110. Thus, in accordance with aspects of the present disclosure, dynamic antenna platform offset calibration may be provided in order to compensate for such antenna platform misalignment, and reduce or eliminate the pointing error associated with antenna platform misalignment.

Figure 4:
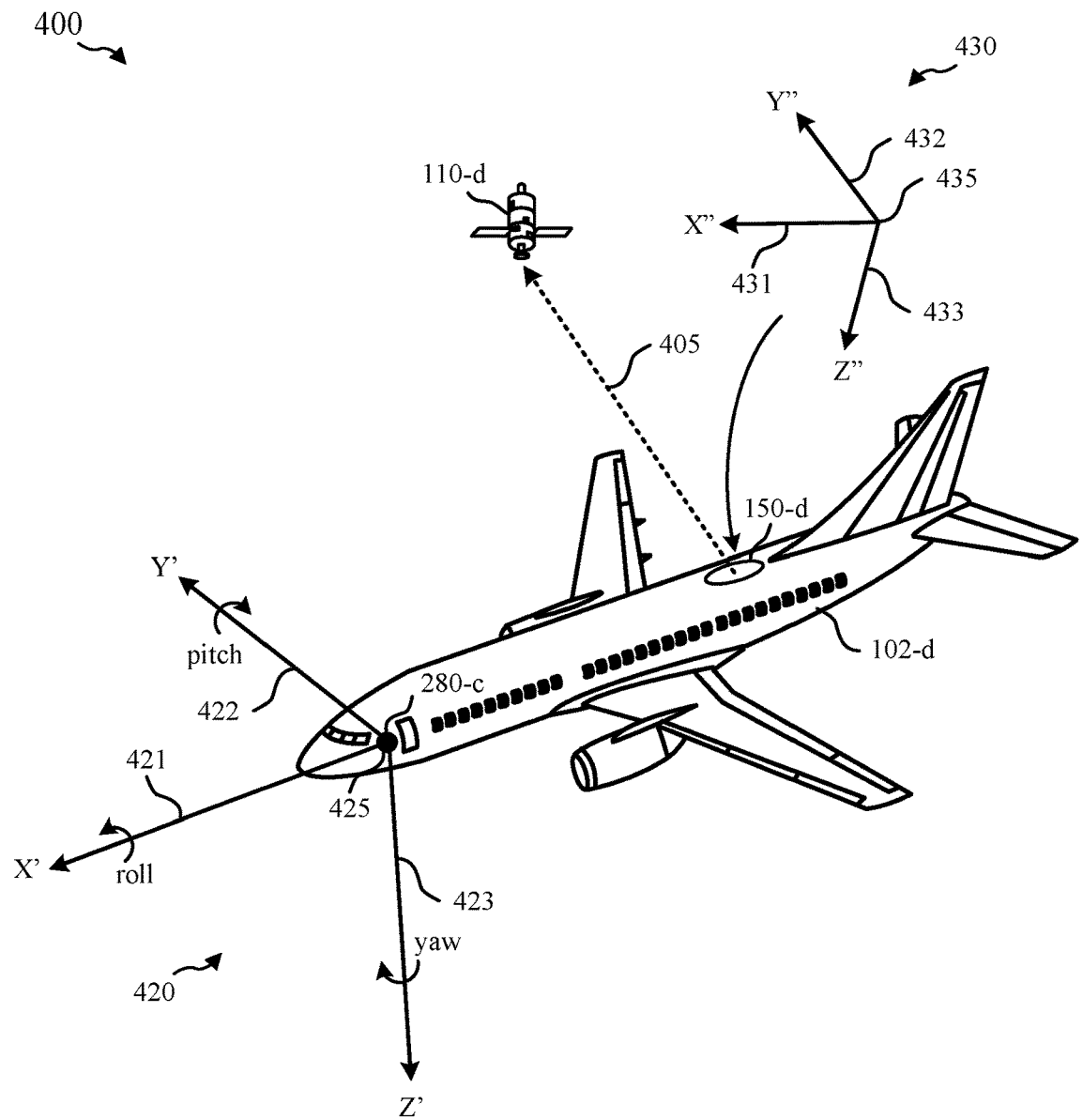
FIG. 4 is an illustration showing a global reference frame, a mobile vehicle reference frame, and an antenna reference frame that may be used to support dynamic antenna alignment offset calibration in accordance with aspects of the present disclosure.

FIG. 4 is an illustration 400 showing a global reference frame 410, a mobile vehicle reference frame 420, and an antenna reference frame 430 that may be used to support dynamic antenna alignment offset calibration in accordance with aspects of the present disclosure. The reference frames may be used to describe positional information associated with a target satellite 110-d and a mobile vehicle 102-d having an antenna system 150-d, and an IRU 280-c, which may be examples of the related components described with reference to FIGS. 1 through 3. For example, the global reference frame 410 may be used to identify a location of the mobile vehicle 102-d and/or the target satellite 110-d. Further, the global reference frame 410, the mobile vehicle reference frame 420, and/or the antenna reference frame 430 may each be used to identify a vector 405 from the antenna system 150-d to the target satellite 110-d. Although each of the reference frames of the illustration 400 are described as three-dimensional reference frames having mutually orthogonal axes, one or more of a global reference frame, a mobile vehicle frame, or an antenna reference frame may be other types of reference frames in other embodiments of dynamic antenna platform offset calibration.

The global reference frame 410 of the illustration 400 is an example of a three-dimensional, topocentric Cartesian coordinate frame. The X axis 411 of the global reference frame 410 may be aligned with the compass heading North. The Y axis 412 of the global reference frame 410 may be aligned with the compass heading East. The Z axis 413 of the global reference frame 410 may be aligned with an earth radian that emanates from the origin 415 of the global reference frame 410 and extends through the center of the earth. The described alignment of the global reference frame 410 may be referred to as a North, East, Down (NED) alignment. Each axis of the global reference frame 410 is orthogonal and forms a 90 degree angle with each of the other axes. In accordance with one embodiment of the present disclosure, the origin 415 of the global reference frame 410 used by the IRU 280-c may be coincident with a latitude and longitude of the mobile vehicle 102-a. In various examples the altitude of the global reference frame 410 may assumed to be zero (e.g., the origin 415 of the global reference frame 410 is at an earth surface, or an otherwise suitable reference elevation such as sea level). In another example, the origin 415 of the global reference frame 410 may be at the center of the earth, the Z axis 413 may be aligned with the compass heading North, and the X axis 411 and the Y axis 412 may each be aligned with a different earth longitude.

The mobile vehicle reference frame 420 may also be a three-dimensional Cartesian coordinate frame, and may be associated with the IRU 280-c aboard the mobile vehicle 120-d. The X' axis 421 of the mobile vehicle reference frame 420 may be aligned with the longitudinal axis (e.g., from rear to front) of the mobile vehicle 102-d. The Y' axis 422 of the mobile vehicle reference frame 420 may be aligned with the lateral axis (e.g., from side to side) of the mobile vehicle 102-d. The Z' axis 423 of the mobile vehicle reference frame 420 may be aligned with the vertical axis (e.g., from top to bottom) of the mobile vehicle 102-d. Unlike the global reference frame 410, which remains fixed in attitude with respect to earth, the mobile vehicle reference frame 420 moves along with (e.g., is fixed with respect to) the mobile vehicle 102-d. In other words, the origin 425 of the mobile vehicle reference frame 420 may be fixed with respect to the mobile vehicle 102-d (e.g., at the location of the IRU 280-c).

The attitude of the mobile vehicle 102-d may be defined by the set of rotations in roll, pitch and yaw between the mobile vehicle reference frame 420 and the global reference frame 410. Roll of the mobile vehicle 102-d may be defined as the rotation of the mobile vehicle 102-d about the X' axis 421 with reference to the X-Y plane of the global reference frame 410 (e.g., as an angle between the Y' axis 422 of the mobile vehicle reference frame 420 and the X-Y plane of the global reference frame 410 when viewed along the X' axis 421). Pitch may be defined as the rotation of the mobile vehicle 102-d about the Y' axis 422 with reference to the X-Y plane of the global reference frame 410 (e.g., as an angle between the X' axis 421 of the mobile vehicle reference frame 420 and the X-Y plane of the global reference frame 410 as viewed along the Y' axis 422). Yaw may be defined as the direction of the X' axis 421 of the mobile vehicle reference frame 420 in the X-Y plane of the global reference frame 410, which during level movement (e.g., level aircraft flight) may correspond to the rotation of the mobile vehicle 102-d about the Z' axis 423 of the mobile vehicle reference frame 420 or the rotation of the mobile vehicle 102-d about the Z axis 413 of the global reference frame 410.

In some examples, positional information indicating the attitude of the mobile vehicle 102-d may be output from the IRU 280-c in the form of three angular displacements. A first angular displacement may represent the rotation in roll, the second may represent the rotation in pitch and the third may represent the rotation in yaw. Although the mobile vehicle reference frame 420 is shown as aligned with the mobile vehicle 102-d, in some examples the mobile vehicle reference frame 420 may be offset from the alignment with the mobile vehicle 102-d due to misalignment between the mobile vehicle 102-d and the IRU 280-c. In some examples the IRU 280-c, or a controller associated with the mobile vehicle 102-d, may compensate for such a misalignment through various calibration operations. In some examples, the IRU 280-c may, therefore, provide values compensated for such misalignment between the IRU 280-c and the mobile vehicle 102-c, such that the IRU 280-c provides attitude values in the mobile vehicle reference frame 420 despite a misalignment between the IRU 280-c and the mobile vehicle 102-d. In other examples, the IRU 280-c provides uncompensated values that are not in the mobile vehicle reference frame 420, and the uncompensated values are alternatively corrected by the receiver of the values (e.g., an ACU 270 and/or an alignment calibration controller 275).

The antenna reference frame 430 may also be a three-dimensional Cartesian coordinate frame, and may be associated with the antenna system 150-d aboard the mobile vehicle 120-d. The X" axis 431 of the antenna reference frame 430 may be aligned with the longitudinal axis of the antenna system 150-d. The Y" axis 432 of the antenna reference frame 430 may be aligned with the lateral axis of the antenna system 150-d. The Z" axis 433 of the antenna reference frame 430 may be aligned with the vertical axis of the antenna system 150-d. The antenna reference frame 430 moves along with (e.g., is fixed with respect to) the antenna system 150-d. In other words, the origin 435 of the antenna reference frame 430 may be fixed with respect to the antenna system 150-d (e.g., at the location of the antenna system 150-d).

The alignment of a beam 155 of the antenna system 150-d (e.g., along the vector 405) may be identified by the antenna system 150-d relative to the antenna reference frame 430. For example, the antenna system 150-d (e.g., a positioner 153 of the antenna system 150-c) may point the beam 155 along the vector 405 by way of a two-dimensional definition of the elevation and azimuth orientations of the vector 405 with respect to the antenna reference frame 430. Elevation of the vector 405 may be defined as an angle between the direction of the vector 405 and the X"-Y" plane of the antenna reference frame 430. Azimuth of the vector 405 may be defined as an angle between the direction of the vector 405 and the X" axis 431 when viewed in the X"-Y" plane (e.g., an angle between the X" axis 431 and a projection of the vector 405 on the X"-Y" plane).

In some examples the antenna system 150-d and the IRU 280-c may be installed on the mobile vehicle 102-d with a particular relative orientation. For example, the antenna system 150-d may be installed on the mobile vehicle 102-d such that the antenna reference frame 430 is nominally aligned with the mobile vehicle reference frame 420, such that the X' axis 421 is aligned with the X" axis 431, the Y' axis 422 is aligned with the Y" axis 432, and the Z' axis 423 is aligned with the Z" axis 433. However, the actual alignment between the antenna reference frame 430 and the mobile vehicle reference from 420 may be different from the nominal alignment between the antenna reference frame 430 and the mobile vehicle reference frame, which may be referred to as an antenna platform misalignment. In other words, for various reasons including those described with reference to FIG. 3, the actual orientation of antenna reference frame 430 with respect to the mobile vehicle reference frame 420 may be different from a nominal orientation of the antenna reference frame 430 with respect to the mobile vehicle reference frame 420.

In order to communicate signals via the antenna system 150-d with the maximum signal strength, the antenna system 150-d (e.g., the ACU 270) may command a positioner 153 to align a beam 155 of the antenna system 150-d in the direction of vector 405. The orientation of the vector 405 can be calculated based on determined values or approximations for the location of the target satellite 110-d, the location of the antenna system 150-d, and the attitude of the antenna system 150-d.

In some examples the location of the target satellite 110-d may be known and available to the ACU 270 (e.g., from a position signal received by the ACU 270, from a position value stored at the ACU 270, or as a position determined by the ACU 270 based on orbital characteristics of the target satellite 110-d known by the ACU 270), and may be expressed in coordinates of the global reference frame 410. In some examples the location of the target satellite 110-d is provided to the ACU 270 from a modem 230 (e.g., a modem 230 as described with reference to FIG. 2) through an input port. In some embodiments, the origin of the reference frame used to define the location of the target satellite 110-d (e.g., a GPS reference frame that identifies a location in terms of latitude, longitude, and elevation) will be displaced from the origin of the global reference frame 410, having an origin at the location of the mobile vehicle 102-d, and the location of the target satellite 110-d may be transformed into the global reference frame 410 (e.g., by the IRU 280-c or the ACU 270).

In some examples the location of the antenna system 150-d may be determined at the antenna system 150-d, such as with a GPS receiver (e.g., GPS 274 described with reference to FIG. 2) that is substantially co-located with the antenna system 150-d and provides positional information comprising the location of the antenna system 150-d. In other examples the location of the antenna system 150-d may be assumed to be (e.g., approximated by) a location that is output by the IRU 280-c that provides positional information comprising the location of the IRU 280-c. In examples where the antenna system 150-d and the IRU 280-c are not co-located, positional error due to the different assembly locations of the IRU 280-c and the antenna system 150-d may be assumed to be negligible and ignored, or the positional differences may be known and compensated for (e.g., by the ACU 270).

Based on the location of the target satellite 110-d and the antenna system 150-d, a first unit vector $\vec{d}$ can be calculated to represent the direction of the vector 405 in the global reference frame 410. The first unit $\vec{d}$ vector $\vec{d}$ may include three components, dx, dy, and dz, defined with respect to the global reference frame 410 (e.g., along the X axis 411, the Y axis 412, and the Z axis 413, respectively).

In general, the mobile vehicle 102-d may not have an attitude that is aligned with the global reference frame 410. That is, the mobile vehicle 102-d may have a heading other than North, an angular pitch displacement relative to the X-Y plane of the global reference frame 410, an angular roll displacement relative to the X-Y plane of the global reference frame 410, or various combinations thereof. In such cases, the first unit vector $\vec{d}$ may be transformed using an alias transformation, which generally transforms the representation of the first unit vector $\vec{d}$ from a first reference frame to a second reference frame.

For reference frames comprising three-dimensional Cartesian coordinate systems, the alias transformation of the first vector $\vec{d}$ from a first reference frame to a second reference frame can be calculated as:

$$\vec{d}'_i = M_i \vec{d}$$

where $\vec{d}$ is the first unit vector in the first reference frame, $\vec{d}'_i$ the unit vector in the second reference frame and $M_i$ is a rotation matrix. The rotation matrix $M_i$ may be calculated as:

$$M_i(R_i, P_i, Y_i) = \begin{bmatrix} \cos(P_i)*\cos(Y_i) & \cos(P_i)*\sin(Y_i) & -\sin(P_i) \\ \sin(R_i)*\sin(P_i)* & \sin(R_i)*\sin(P_i)* & \sin(R_i)*\cos(P_i) \\ \cos(Y_i) - & \sin(Y_i) + & \\ \cos(R_i)*\sin(Y_i) & \cos(R_i)*\cos(Y_i) & \\ \cos(R_i)*\sin(P_i)* & \cos(R_i)*\sin(P_i)* & \cos(R_i)*\cos(P_i) \\ \cos(Y_i) + & \sin(Y_i) - & \\ \sin(R_i)*\sin(Y_i) & \sin(R_i)*\cos(Y_i) & \end{bmatrix} \quad (2)$$

where $R_i$ is the roll offset between the first reference frame and the second reference frame, $P_i$ is the pitch offset between the first reference frame and the second reference frame, and $Y_i$ is the yaw offset between the first reference frame and the second reference frame. Thus, the rotation matrix $M_i$ may be used to perform the alias transformation of the first unit vector $\vec{d}$ in the global reference frame 410 to determine a corresponding second unit vector $\vec{d}'_i$ representing the direction of the vector 405 in the mobile vehicle reference frame 420.

If both the location of the target satellite 110-*d* and the antenna system 150-*d* are known and the antenna reference frame 430 is aligned with the mobile vehicle reference frame 420, the second unit vector $\vec{d}'_i$ from the antenna system 150-*d* to the target satellite 110-*d* in the mobile vehicle reference frame 420 could be calculated by applying Eq. 2 using the roll, pitch and yaw output from the IRU 280-*c*, which could then be used to determine an azimuth and elevation command to provide to a positioner 153 of the antenna system 150-*d*. However, as described herein, the antenna system 150-*d* may be mounted to the mobile vehicle 102-*d* with an antenna platform misalignment, such that the antenna system 150-*d* is not perfectly aligned with the IRU 280-*c*. That is, the attitude in the antenna reference frame 430 may be offset from the attitude of the mobile vehicle 102-*d*, which may cause pointing errors. In accordance with aspects of the present disclosure, dynamic antenna platform offset calibration may be performed to compensate for such antenna platform misalignment, and the dynamic antenna platform offset calibration may include alignment calibration procedures performed during various travel segments of the mobile vehicle 102-*d* for a set of spatial conditions (e.g., antenna azimuth directions, mobile vehicle heading directions) that satisfy a spatial distribution threshold.

In one example of the alignment calibration procedure, the first unit vector $\vec{d}$ from the antenna system 150-*d* to the target satellite 110-*d* (e.g., in the direction of vector 405) is first calculated in the global reference frame 410. For the purpose of determining the first unit vector a, the difference between the location of the IRU 280-*c* or the ACU 270 and the location of the antenna system 150-*d* may be considered to be negligible, such that the location of the IRU 280-*c* or the location of the ACU 270 (e.g., as determined by a GPS collocated with the IRU 280-*c* or the ACU 270) may be used as an approximation of the location of the antenna system 150-*d*. Further, any difference in the location of the origin 415 of the global reference frame 410 used to define the location of the target satellite 110-*d* and the origin of the reference frame used to define the location of the mobile vehicle 102-*d* (e.g., a location output of the IRU 280-*c* or the location output of the ACU 270, such as a GPS output in latitude, longitude, and elevation) may be managed by a translation of the coordinates from one reference frame to the other. With a determined location of the target satellite 110-*d* and a determined location of the mobile vehicle 102-*d* being known in the global reference frame 410, the calculation of the first unit vector $\vec{d}$ is straightforward.

Next, the first unit vector $\vec{d}$ may be transformed by an alias transformation to the mobile vehicle reference frame 420 to determine a second unit vector $\vec{d}'_i$ in the direction of the vector 405. This may be accomplished using the alias transformation noted above in Eq. 1. The first unit vector $\vec{d}$ is multiplied with the rotation matrix $M_i(R_i, P_i, Y_i)$, of Eq. 2, where $R_i$, may be the amount of roll as indicated by the IRU 280-*d*, $P_i$, may be the amount of pitch as indicated by the IRU 280-*d*, and $Y_i$ may be the amount of yaw as indicated by the IRU 280-*d*.

If the antenna reference frame 430 is aligned with the mobile vehicle reference frame 420 (e.g., if the antenna system 150-*d* is nominally aligned with the IRU 280-*d*), the second unit vector $\vec{d}'_i$ in the mobile vehicle reference frame 420 can be used directly to determine azimuth and elevation of the antenna system 150-*a* (e.g., by the ACU 270, for commanding the positioner 153). For example, azimuth and elevation may be generally identified in a particular reference frame by the following equations:

$$\alpha_i = \tan^{-1}\left(\frac{\vec{d}_{iy}}{\vec{d}_{ix}}\right) \quad (3)$$

$$\epsilon_i = \tan^{-1}\left(\frac{-\vec{d}_{iz}}{\sqrt{(\vec{d}_{ix})^2 + (\vec{d}_{iy})^2}}\right)$$

where $\vec{d}_{ix}$, $\vec{d}_{ix}$, and $\vec{d}_{ix}$ are the x, y, and z components in the particular reference frame. When the antenna reference frame 430 is aligned with the mobile vehicle reference frame 420, the second unit vector $\vec{d}'_i$ in the mobile vehicle reference frame 420 will have the same x, y, and z, components as the corresponding unit vector in the antenna reference frame 430, and therefore the calculated azimuth and elevation will be the same using either reference frame. However, when there is an antenna platform misalignment between the mobile vehicle reference frame 420 and the antenna reference frame 430, directly using the second unit vector $\vec{d}'_i$ to determine an antenna azimuth and elevation, rather than the corresponding unit vector in the antenna reference frame 430, will result in the beam 155 of the antenna system 150-*d* not being pointed directly at the target satellite 110-*d* (e.g., due to antenna pointing error associated with the antenna platform offset).

The pointing error can be identified by peaking the antenna system 150-*d* during an alignment calibration procedure (e.g., as directed by an alignment calibration controller 275), and reading the resulting azimuth and elevation directly from an antenna positioning motor or a sensor on the antenna system 150-*d*, for example. However, correcting the error in this manner is only valid for that particular orientation (e.g., azimuth direction of the beam 155 or heading of the mobile vehicle 102-*d*). In order to provide a more general solution that will be valid in all orientations, the methods and apparatus according to the present disclosure may providing a best fit rotation matrix between the mobile vehicle reference frame 420 and the antenna reference frame 430 while simultaneously supporting the communication of user data during a travel segment of the mobile vehicle 102-*a*.

In accordance with one embodiment of the disclosure, the antenna system 150-*d* is peaked during user data communications of a travel segment to determine the azimuth and elevation directions of the antenna system 150-*d* that results in the maximum signal strength being communicated in a signal between the target satellite 110-*d* and the antenna system 150-*d*. Signal strength can be determined based on the amplitude, signal to noise ratio (SNR), amount of received power, or other such metric related to the user data communication, which may include forward link user data or return link user data. In various examples the azimuth and elevation may be determined by control signals provided to a positioner 153 (e.g., a positioning mechanism or a beamformer), read directly from a positioner 153, or read from a positioner sensor of the antenna system 150-*d*.

In accordance with one embodiment of the disclosed method and apparatus, a step track technique is used (e.g., by an alignment calibration controller) as an alignment calibration procedure to "peak" the antenna. In one such step track peaking procedure, the antenna system 150-*a* points a beam 155 toward the target satellite 110-*d* using an estimated pointing direction, identified in antenna elevation and azimuth, that is based at least in part on positional information of the mobile vehicle 102-*d* (e.g., a location of the mobile vehicle 102-*d*, and an attitude of the mobile vehicle 102-*d*). In some examples, the offset between the mobile vehicle reference frame 420 and the antenna reference frame 430 will not be so great that the signal communicated via the beam 155 is not detectable. Therefore, in accordance with one embodiment, the antenna azimuth and elevation calculated under the assumption that there is no offset between the mobile vehicle reference frame 420 and the antenna reference frame 430 is a sufficiently accurate estimate at which to begin the peaking procedure.

In examples where calibration is performed on signals received at the antenna system 150-*d*, a measurement of a signal characteristic of the user data received through the antenna system 150-*d* may be performed. The orientation of the beam 155 may subsequently be changed in elevation and/or azimuth by one "step" by the ACU 270 (e.g., as directed by the alignment calibration controller 275) providing an associated command to a positioner 153 (e.g., a pointing mechanism and/or a beamformer). In some examples the alignment calibration controller 275 may direct the antenna system 150-*a* to implement the peaking technique based on received power measurements provided from a modem 230. Additionally or alternatively, the received power may be measured by a device other than a modem, that is located elsewhere along the receive chain can be used to measure the received power.

For example, if the level of received power drops after changing the elevation of the beam 155, the antenna system 150-*d* may move the beam in the opposite elevation direction. In one embodiment, the antenna system 150-*d* moves the orientation of the beam 155 by two steps. If the amount of received power increases, the beam 155 is moved another step further in that direction. Another power measurement is made. Each time the amount of receive power increases, the beam 155 is moved another "step" in the same direction that results in the greater signal strength being received in a signal from the target satellite 110-*d*. Upon measuring a drop in the received power, the direction of the beam 155 may be moved one step back. Once the peak power measurement for elevation has been detected, the antenna may begin a similar search for the peak signal characteristic in the azimuth direction. If the initial azimuth direction was not associated with the peak received power measured from the user data, then the search in the elevation direction may be repeated. If the antenna was not at the elevation associated with the peak received power, then the search in the azimuth direction may again repeated. This process may continue until a direction for the peak received power is determined in both the elevation and the azimuth directions.

Although the described step track procedure is one example of an alignment calibration procedure that may support dynamic antenna platform offset calibration, many modifications to this procedure can be implemented to improve the likelihood that the beam 155 is at the best pointing elevation and azimuth. Furthermore, other peaking techniques can be employed to provide an alignment calibration procedure, such as, but not limited to, techniques known commonly as conical scan (conscan) or sine scan.

In addition to determining the azimuth and elevation of the beam 155 associated with the peak signal characteristic, the alignment calibration controller 275 may associate the alignment calibration procedure with a spatial condition. In one example, the alignment calibration controller 275 may associate the calibration procedure with an azimuth direction of the beam 155 (e.g., as an average azimuth direction over the alignment calibration procedure, or an azimuth direction at an initial, middle, or final time of the alignment calibration procedure). In another example, the alignment calibration controller 275 may associate the calibration procedure with a heading direction of the mobile vehicle 102-*d* (e.g., as an average heading direction over the alignment calibration procedure, or a heading direction at an initial, middle, or final time of the alignment calibration procedure). In various examples, the spatial condition associated with an alignment calibration procedure may include any one or more of azimuth of the beam 155, elevation of the beam 155, yaw of the mobile vehicle 102-*d*, pitch of the mobile vehicle 102-*d*, roll of the mobile vehicle 102-*d*, or other indications of spatial alignment between the mobile vehicle 102-*d* and the target satellite 110-*d*, or other indications spatial orientation of the antenna system 150-*d* (e.g., positioner alignment directions). Results from the alignment calibration procedure (e.g., a calibration vector set) may later be used to determine an antenna platform offset.

As previously discussed, a single calibration vector set may not be suitable for determining an antenna platform offset. Further, a cluster of calibration vector sets with little spatial separation leads to a poor solution (e.g., a poorly conditioned matrix where small errors in the measurement lead to larger errors in the solution). Thus, in accordance with aspects of the present disclosure, the alignment calibration controller 275 may continue to perform alignment calibration procedures during the communication of user data until determining that the alignment calibration procedure has been performed for a plurality of spatial conditions that satisfy a spatial separation criteria.

For example, when the spatial condition associated with the alignment calibration procedures comprises an azimuth direction of the beam 155, the 360 degrees of azimuth range may be divided into eight "bins" each covering a different 45-degree range of azimuth. In one example, the alignment calibration procedures may be repeated by the alignment calibration controller 275 until a calibration vector set is obtained for an azimuth direction in each of the bins. In another example, the alignment calibration procedures may be repeated by the alignment calibration controller 275 until there are no longer two adjacent bins that are not associated with an alignment calibration procedure (e.g., having completed an alignment calibration procedure for at least every other bin). In another example, the alignment calibration procedures may be repeated by the alignment calibration controller 275 until the maximum angular separation between adjacent azimuth directions associated with a completed alignment calibration procedure is below a threshold angle (e.g., 45 degrees, or some other angle, between azimuth directions associated with a respective alignment calibration procedure).

A calibration vector set may be associated with each of the alignment calibration procedures performed at the plurality of spatial conditions. In various examples the calibration vector sets may each be determined upon the completion of a respective alignment calibration procedure, or the calibration vector sets may be calculated upon determining that the alignment calibration procedure has been performed for the plurality of spatial conditions that satisfy the spatial separation criteria. The calibration vector sets may each include vector information to be used in calculating the antenna platform offset between the antenna system 150-$d$ (e.g., antenna reference frame 430) and the IRU 280-$c$ (e.g., mobile vehicle reference frame 420), which may be an approximation of the antenna platform offset between the antenna system 150-$d$ and the IRU 280-$c$.

In one example each calibration vector set may include an estimated pointing direction from the antenna to the target satellite that is determined based at least in part on positional information of the mobile vehicle (e.g., the theoretical direction to the target satellite 110-$d$, which may be based on previously-determined offsets), and also the peaked pointing direction from the antenna to the target satellite that is determined during the respective alignment calibration procedure.

In some examples the estimated pointing direction and the peaked pointing direction (e.g., of a calibration vector set) may each be identified in antenna azimuth and antenna elevation directions. The azimuth and elevation at each spatial condition may each be converted to a respective third unit vector $\vec{d}''_i$ in the antenna reference frame 430 using the following relationship, where a is antenna azimuth and E is antenna elevation:

$$\vec{d}''_{ix} = \cos \epsilon_i \cos \alpha_i$$

$$\vec{d}''_{iy} = \cos \epsilon_i \sin \alpha_i$$

$$\vec{d}''_{iz} = -\sin \epsilon_i \quad (4)$$

Accordingly, for each spatial condition, there may be a first unit vector $\vec{d}$ representing the estimate of the pointing direction determined by the location of the antenna system 150 and the location of the satellite 106, in coordinates defined with respect to the global reference frame 410 (e.g., the topocentric NED reference frame). In addition, there may be a second unit vector $\vec{d}'_i$ representing the estimate of the pointing direction in coordinates defined with respect to the mobile vehicle reference frame 420 (e.g., a reference frame of the IRU 280-$c$) and a third vector $\vec{d}''_i$ representing the peaked pointing direction in coordinates defined with respect to the antenna reference frame 430. The collection of second unit vectors $\vec{d}'_i$ in the mobile vehicle reference frame 420 forms a first matrix $\overline{D}'$, which may have dimensions of M rows and N columns, where M is the number of second unit vectors and N is the number of axes of the mobile vehicle reference frame 420 (e.g., three, with the columns representing the x', y', and z' components, respectively). The collection of third unit vectors $\vec{d}''_i$ in the antenna reference frame 430 forms a second matrix $\overline{D}''$, which may also have dimensions of M rows and N columns, where M is the number of third unit vectors (e.g., equal to the number of second unit vectors) and N is the number of axes of the antenna reference frame 430 (e.g., also three, representing the x'', y'', and z'' components, respectively). If each collection of second and third vectors has no measurement noise or other source of error or inconsistency, then the first matrix is related to the second by the following equation, where T is a rotation matrix:

$$\overline{D}'' = T\overline{D}' \quad (5)$$

Once a sufficient number of measurements for $\vec{d}'_i$ and $\vec{d}''_i$ have been gathered (e.g., measurements at the plurality of spatial conditions that satisfy the spatial separation criteria), the rotation matrix T can be solved. By solving for T, the general transformation from the mobile vehicle reference frame 420 to the antenna reference frame 430 can be calculated (e.g., the antenna platform offset in each of the three axes, roll, pitch and yaw can be determined and used to calculate an alias transformation). Subsequently, the output of the IRU 280-$c$ can be transformed by the alias transformation (e.g., the antenna platform offset) prior to being used to calculate the azimuth and elevation needed to point the beam 155 to the target satellite 110-$d$.

In some examples, solving for T in Eq. 5 may include using the pseudoinverse of the collection of vectors in the mobile vehicle reference frame 420. One example is to use singular value decomposition (SVD) to determine the pseudoinverse of the collection of vectors D' in the mobile vehicle reference frame 420 (where the notation $B^+$ represents the pseudoinverse of B). By multiplying each side of equation Eq. 5 by the pseudoinverse $\overline{D}'^+$ of $\overline{D}'$, the following equations result:

$$\overline{D}'' = T\overline{D}'$$

$$\overline{D}''\overline{D}'^+ = T\overline{D}'\overline{D}'^+$$

$$T = \overline{D}''\overline{D}'^+ \quad (6)$$

The pseudoinverse can be calculated by using the elements of the SVD of $\overline{D}'$:

$$\overline{D}' = USV^*$$

$$\overline{D}'^+ = VS^+U^* \quad (7)$$

where U is a real or complex unitary matrix, S is a rectangular diagonal matrix with non-negative real numbers on the diagonal, and V is a real or complex unitary matrix The elements of Eq. 7 may be solved according to various linear algebra methods. For example, the pseudoinverse of S may be computed by taking the transpose of the matrix formed with diagonal elements equal to the reciprocal of the diagonal elements of S. For a collection of measurements that are noisy or that have other errors, use of the pseudoinverse will produce a least-squares estimate $\hat{T}$ of the rotation T:

$$\hat{T} = \overline{D}''\overline{D}'^{+} \quad (8)$$

where $\hat{T}$ may be interpreted as the product of roll, pitch, and yaw rotations.

Although the SVD calculations described herein illustrate one example for solving for, or estimating the rotation matrix T that minimizes the error between $\overline{D}''$ and $\overline{D}'$, other methods may be used, such as Procrustes analysis. The elements of the rotation matrix T, or estimate thereof (e.g., the least squares estimate $\hat{T}$ of the composition rotation matrix T), may be used to derive the roll, pitch and yaw offsets of the antenna reference frame 430 relative to the mobile vehicle reference frame 420 (e.g., an antenna platform offset calibration between the vectors $\vec{d}'_i$ and $\vec{d}''_i$). For example, the composite rotation matrix $T_i$ may be given as:

$$T_i(R_0, P_0, Y_0) = \begin{bmatrix} r_{11} & r_{11} & r_{11} \\ r_{11} & r_{11} & r_{11} \\ r_{11} & r_{11} & r_{11} \end{bmatrix} = \quad (9)$$

$$\begin{bmatrix} \cos(P_0)*\cos(Y_0) & \cos(P_0)*\sin(Y_0) & -\sin(P_0) \\ \sin(R_0)*\sin(P_0)* & \sin(R_0)*\sin(P_0)* & \sin(R_0)*\cos(P_0) \\ \cos(Y_0)- & \sin(Y_0)+ & \\ \cos(R_0)*\sin(Y_0) & \cos(R_0)*\cos(Y_0) & \\ \cos(R_0)*\sin(P_0)* & \cos(R_0)*\sin(P_0)* & \cos(R_0)*\cos(P_0) \\ \cos(Y_0)+ & \sin(Y_0)- & \\ \sin(R_0)*\sin(Y_0) & \sin(R_0)*\cos(Y_0) & \end{bmatrix}$$

Accordingly, from Eq. 9, the solutions to the roll, pitch and yaw rotation may be determined as follows:

$$Y_0 = \tan^{-1}(r_{12}/r_{11})$$

$$P_0 = \tan^{-1}(-r_{13}/\sqrt{r_{23}^2 + r_{33}^2})$$

$$R_0 = \tan^{-1}(r_{23}/r_{33}) \quad (10)$$

Thus, a vector represented in the mobile vehicle reference frame 420 (e.g., a vector derived in the global reference frame 410 and translated to the mobile vehicle reference frame 420, or a vector identified in the mobile vehicle reference frame 420, such as an output of the IRU 280-c) can subsequently be transformed by an alias transform to the antenna reference frame 430 using knowledge of the roll, pitch, and yaw rotations (e.g., the antenna platform offset) determined by Eq. 10. In accordance with aspects of the present disclosure, this knowledge of the roll, pitch, and yaw rotations may therefore be applied to the output of the IRU 280-c to compensate for antenna platform misalignment between the antenna system 150-d and the IRU 280-c, and an azimuth and elevation can be calculated based on the compensated IRU data (e.g., by applying Eq. 3 to the components of a unit vector $\vec{d}''_i$ aligned with a pointing direction in the antenna reference frame 430).

Figure 5:
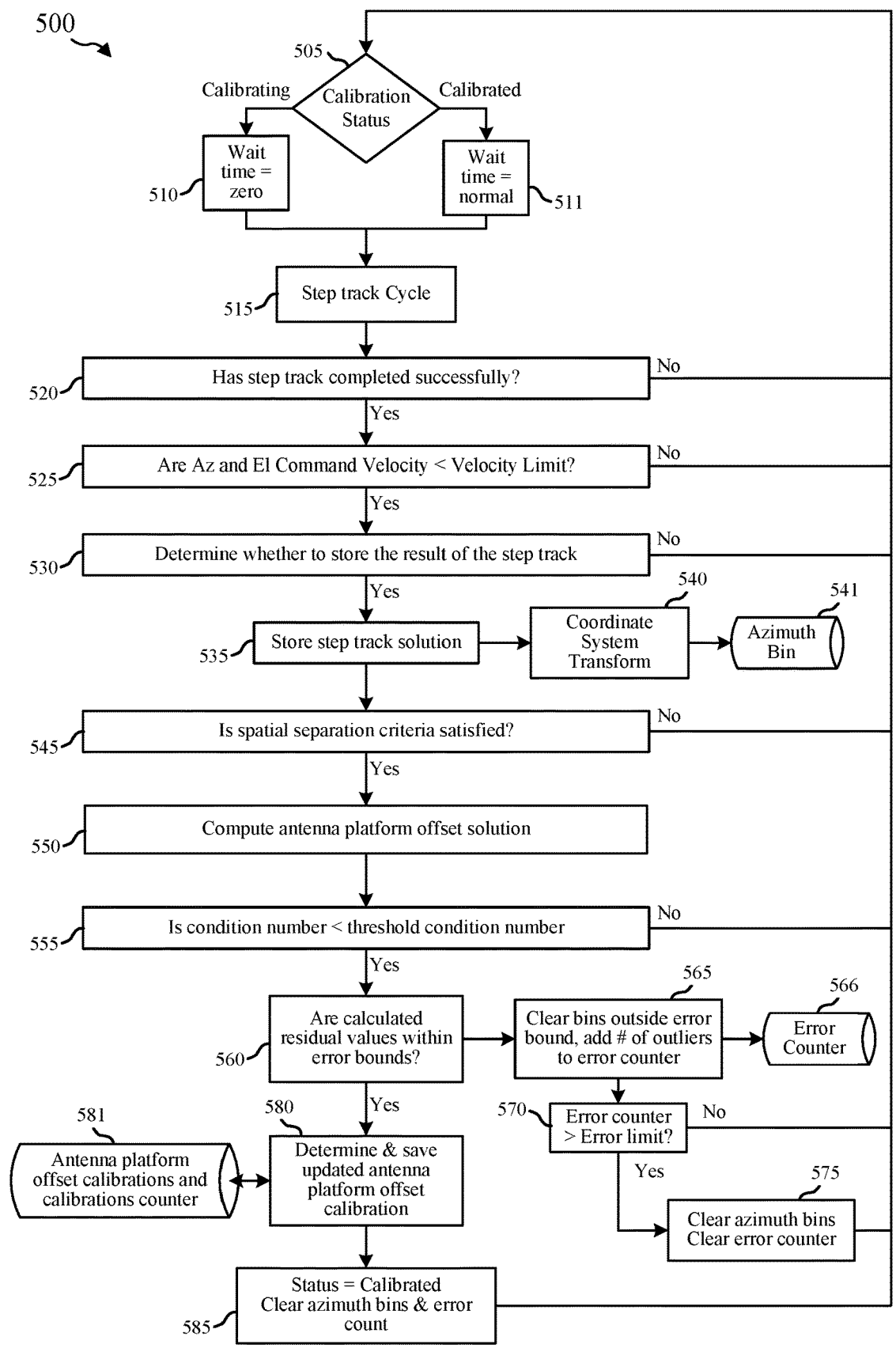
FIG. 5 illustrates an example of a method for dynamic antenna platform offset calibration in accordance with aspects of the present disclosure.

FIG. 5 illustrates an example of a method 500 for dynamic antenna platform offset calibration in accordance with aspects of the present disclosure. The operations of the method 500 are described with reference to an antenna system 150, including an alignment calibration controller 275, an ACU 270, a positioner 153 (e.g., a pointing mechanism and/or a beamformer), and an antenna 152 associated with a beam 155, which may be examples of the corresponding components described with reference to FIGS. 1 through 4. The operations may be performed according to a global reference frame 410, a mobile vehicle reference frame 420, and an antenna reference frame 430, as described with reference to FIG. 4. The antenna system 150 may be mounted on a mobile vehicle 102 to support communications with a target satellite 110, which may be examples of a mobile vehicle 102 or a target satellite 110 described with reference to FIGS. 1 through 4. Although method 500 is described with reference to a single target satellite 110, various communications and dynamic antenna platform offset calibration operations may be performed with more than one target satellite 110, including those operations described below with reference to one or more target satellites 110.

In the example of method 500, the spatial condition associated with an alignment calibration procedure is the beam azimuth direction (e.g., identified with reference to the antenna reference frame 430). For example, an alignment calibration procedure (e.g., a step track cycle) may be associated with a particular azimuth direction, which may be calculated as an average or weighted average of azimuth over the duration of the alignment calibration procedure, or an initial, middle, or final azimuth angle during the alignment calibration procedure. Accordingly, when a step track cycle associated with a particular azimuth angle is performed (e.g., when a step track cycle is performed while the antenna is pointed in a particular azimuth direction or range of directions), the associated calibration vector set may provide a step track solution for the azimuth bin that includes the particular azimuth angle. Although the method 500 is described with reference to azimuth angle, in other examples spatial conditions may include one or more other characteristics (e.g., beam azimuth, beam elevation, mobile vehicle yaw, mobile vehicle pitch, mobile vehicle roll, relative position between the mobile vehicle 102 and the target satellite 110, or any combination thereof).

Further, in the example of method 500, the spatial separation criteria associated with performing an antenna platform offset calibration is the filling of azimuth "bins," where each bin represents a different 45-degree range of beam azimuth direction, and a total of 8 bins are associated with the entire range of 360 degrees of beam azimuth. In the example of method 500, an antenna platform offset is determined upon performing an alignment calibration procedure for azimuth directions in each of the eight bins. Although filling each of the spatial bins that define a range is used to illustrate satisfying a spatial separation criteria in the example of method 500, different spatial separation criteria may be used, such as filling a different distribution of bins (e.g., every other bin, or filling bins until there are no longer two adjacent bins that have not been filled), or performing an alignment calibration procedure for a set of spatial conditions having no greater than a threshold amount of separation (e.g., a set of beam azimuth directions where a largest separation between adjacent directions is no greater than 45 degrees).

At 505 the method 500 may include determining a calibration status of the antenna system 150. For example, at 505 the alignment calibration controller 275 may determine that a prior antenna platform offset calibration procedure has not been performed, which may include determining that the antenna system 150 is operating with no prior calibration (e.g., a 'zero' antenna alignment platform offset) or a manual antenna alignment platform offset calibration (e.g., a manually-entered calibration such as a physically measured antenna alignment offset or a statistical average antenna alignment offset, or some other default calibration). If the alignment calibration controller 275 determines at 505 that a prior antenna platform offset calibration procedure has not been performed, which may be associated with communication operations according to a first tracking mode as described herein, the alignment calibration controller 275 may set the calibration status to "calibrating" and proceed to 510. In other examples the alignment calibration controller 275 may determine that a prior antenna platform offset calibration procedure has been performed, which may include determining that the antenna system 150 is operating with a previously determined antenna platform offset calibration. If the alignment calibration controller 275 determines at 505 that a prior antenna platform offset calibration procedure has been performed, which may be associated with communication operations according to a second tracking mode, the alignment calibration controller 275 may set the calibration status to "calibrated" and proceed to 511.

At 510, the method 500 may include the alignment calibration controller 275 waiting for a first amount of time prior to proceeding with operations associated with determining an antenna platform offset calibration. According to the example of method 500, the wait time may be zero, in which case the method 500 proceeds directly from 505 to 515. In other examples the method 500 may include the alignment calibration controller 275 waiting for a relatively short amount of time (e.g., in comparison with the wait time of 511). Thus, according to the wait time of 510, the subsequent calibration operations may be directed by the alignment calibration controller 275 according to a first periodic interval (e.g., a first periodicity). In the case where the wait time of 510 is zero, the subsequent calibration operations may be performed continuously. While waiting at 510, the antenna system 150 may support user data communications by pointing the beam 155 of the antenna 152 towards the target satellite 110 at the estimated aligned direction (e.g., as determined by positional information of the mobile vehicle 102, without a sweeping of the beam 155 to misaligned directions associated with an alignment calibration procedure).

With the relatively short wait time of 510, an antenna platform offset may be determined relatively quickly (e.g., for determining an initial antenna platform offset while operating according to a first tracking mode). Further, the relatively short wait time of 510 may also support more frequent step track cycles that refine pointing of the beam 155 in the absence of an antenna platform offset calibration, or with a relatively coarse antenna platform offset calibration. However, in some examples (e.g., while operating according to a first tracking mode) user data communications may be somewhat degraded due to relatively frequent pointing of the beam 155 in misaligned directions, which may be associated with communicating relatively frequently with a lower gain of the antenna 152. For example, the relatively lower gain of the antenna 152 in the misaligned directions may be compensated for by using a relatively lower MCS for user data communications, which may be associated with a reduction of the data rate of user data communications.

At 511, the method 500 may include the alignment calibration controller 275 waiting for a second amount of time prior to proceeding with procedures associated with determining an antenna platform offset. According to the example of method 500, the wait time may be "normal", which may be a period of time measured in second, minutes, hours, clock cycles, computational cycles, or others. In other words, at 511 the method 500 may include the alignment calibration controller 275 waiting for a relatively long amount of time (e.g., in comparison with the wait time of 510). Thus, according to the wait time of 511, the subsequent alignment calibration procedure may be directed by the alignment calibration controller 275 according to a second periodic interval (e.g., a second periodicity). According to one example, the "normal" wait time may be 10 minutes, such that alignment calibration procedures may be performed every 10 minutes. While waiting at 511, the antenna system 150 may support user data communications by pointing the beam 155 of the antenna 152 towards the target satellite 110 at the estimated aligned direction (e.g., as determined by positional information of the mobile vehicle 102, without a sweeping of the beam 155 to misaligned directions associated with an alignment calibration procedure).

With the relatively longer wait time of 511, an antenna platform offset may be determined relatively slowly (e.g., for determining ongoing refinement to an antenna platform offset while operating according to a second tracking mode). However, in some examples (e.g., while operating according to a second tracking mode) user data communications may be somewhat improved due to relatively infrequent pointing of the beam 155 in misaligned directions. In other words, communicating according to a second tracking mode associated with the longer wait time of 511 may be associated with more frequent communications having a relatively higher gain of the antenna 152, which may support relatively higher data rates by way of a relatively higher modulation and coding rate.

Although illustrated with two different wait times, antenna platform offset calibration procedures in accordance with the present disclosure may have more than two wait times following the operations of 505. For example, a wait time between 505 and 515 may be calculated by the alignment calibration controller 275 based on various factors including an operating mode, a calculated quality of calibration(s), a user data communications rate (e.g., less frequent alignment calibration procedures when user data rate is relatively high, and more frequent alignment calibration procedures when user data rate is relatively low), or other factors. Thus, the operations of an antenna alignment offset calibration procedure in accordance with the present disclosure may be performed by the alignment calibration controller 275 according to various periodic intervals.

At 515, the method 500 may include the alignment calibration controller 275 performing a step track cycle during the communication of user data with the target satellite 110 via the beam 155, which may be an example of performing an alignment calibration procedure in accordance with aspects of the present disclosure. The step track cycle described herein may include various examples of pointing the beam 155 at directions different from a nominal direction (e.g., misaligned directions different from an estimate of an aligned direction between the antenna 152 and the target satellite 110), and determining whether a signal characteristic measured from the communication of user data is greater to, or lesser than when the beam 155 is pointed in the nominal direction. In some examples the step track cycle performed at 515 may include scanning across a plurality of orientations of the beam 155, and may occur over a period of approximately 30 to 60 seconds.

Accordingly, the step track cycle may identify a difference between an estimated direction of highest gain for the beam 155 of the antenna 152 (e.g., an estimate of an aligned direction between the antenna 152 and the target satellite 110-e), and a peaked direction associated with the direction of the beam 155 having a peak signal characteristic (e.g., highest signal strength or highest SNR) as measured during user data communication with the target satellite 110. The estimated pointing direction from the antenna 152 to the target satellite 110 may be determined based at least in part on positional information of the mobile vehicle 102 (e.g., position and attitude as provided by an IRU and/or a GPS), and the peaked pointing direction from the antenna 152 to the target satellite 110 may be determined based at least in part on a measured signal characteristic of the user data communicated during the alignment calibration procedure of 515.

In some examples at 515, the method 500 may also include recording the angular velocity of the pointing of the beam 155 during the step track cycle. For example, at 515 the angular velocity of the beam 155 in terms of azimuth rate and elevation rate may be recorded into memory (e.g., associated with the alignment calibration controller 275) by calculating a running summation of values (e.g., according to a sum of squared values for azimuth and elevation such as sumVelSqAz+=AzCmdVel*AzCmdVel and sumVelSqEl+=ElCmdVel*sumVelSqEl, where "sumVelSq" refers to a running summation of velocity squared, "CmdVel" refers to a velocity command for a particular data sample). At 515, the method 500 may also include recording (e.g., incrementing) the number of data samples recorded during the respective step track cycle, which may be used as a divisor of the running summation of values for calculating an RMS of the angular velocity of pointing the beam 155. Alternatively, the number of data samples may be otherwise predetermined, such as a determined number of samples associated with a predetermined time to perform a step track cycle.

The step track cycle may be performed with respect to the degrees of freedom of the positioner 153, which in the example of method 500 includes an elevation degree of freedom and an azimuth degree of freedom. Accordingly, the step track cycle at 515 may be associated with an estimate of an aligned direction of the beam 155 with respect to beam elevation and azimuth (e.g., relative to the antenna reference frame 430), and a peaked direction of the beam 155 with respect to beam elevation and azimuth as measured by or commanded to the positioner 153 (e.g., relative to the antenna reference frame 430). In other examples of dynamic antenna platform offset calibration, the degrees of freedom of a positioner 153 may be different from elevation and azimuth, and the methods described herein may be adjusted accordingly.

In examples where the antenna system 150 is operating with a "zero" antenna platform offset calibration, the estimate of the aligned direction of the beam 155 may assume no antenna platform misalignment (e.g., assuming zero antenna platform offset in a calculation, or omitting the calculation that considers antenna platform offset entirely). The peaked direction of the beam 155 may be different from the estimate of the aligned direction of the beam 155 due at least in part to an antenna platform misalignment between the antenna 152 and a sensor of the mobile vehicle 102. In examples where the estimated and peaked pointing directions change over the course of the step track cycle at 515 (e.g., due to movement of the target satellite 110-e, movement of the mobile vehicle 102-e, a change in attitude of the mobile vehicle 102-e, or a combination thereof), the estimated and peaked pointing directions may be averages, weighted averages, RMS, or some other statistical calculation of the pointing data associated with the step track cycle at 515.

Although wait times of 510 and 511 are illustrated as being different between the "calibrating" and "calibrated" states, other parameters may also be changed between the "calibrating" and "calibrated" steps. For example, operations of an alignment calibration procedure at 515 may be performed differently based at least in part on the calibration state. Applying the calibration state at 515 may include determining a step track duration, step track azimuth and elevation increments, azimuth and elevation rates, and others, based at least in part on the current calibration state. In another example, an alignment calibration procedure may include conscan operations to determine an antenna pointing offset, and the conscan operations may be performed relatively quickly in the "calibrating" state and relatively slowly in the "calibrated" state.

At 520, the method 500 may include the alignment calibration controller 275 determining whether the step track cycle has completed successfully. In various examples, the step track cycle at 515 may not have been completed successfully if the calculated antenna pointing offsets are excessively high, if the estimate of the beamwidth is outside certain limits, if the signal variation was too high, if a difference between antenna pointing offsets determined for multiple sub-procedures of the step track cycle do not match closely enough, if the antenna lost communication with the satellite, if the step track cycle was interrupted, or if the satellite and/or the antenna went offline. If it is determined at 520 that the step track cycle has not completed successfully, the method 500 may return to 505. If it is determined at 520 that the step track cycle has completed successfully, the method 500 may determine an antenna pointing offset for pointing the beam 155 towards the target satellite 110 of the step track cycle at 515, or a different target satellite 110, for subsequent communication of first user data based at least in part on the positional information of the mobile vehicle 102-e and the antenna pointing offset determined at 520, and the method 500 may proceed to 525. In other examples an alignment calibration procedure may not explicitly be "completed," such as when the alignment calibration procedure is performed continuously. In such examples, at 520 the alignment calibration controller 275 may alternatively determine that a suitable subset of calibration data has been successfully acquired (e.g., upon determining that the criteria described above are met, and according to a periodic collection of values), and accordingly proceed to 525 upon such a determination while the alignment calibration procedure continues to be performed.

At 525, the method 500 may include alignment calibration controller 275 determining whether the commanded azimuth (Az) and elevation (El) velocities of the step track cycle at 515 are below a velocity limit (e.g., a threshold angular rate). For example, when the commanded azimuth and elevation velocities are above the velocity limit, the beam 155 may have been pointed at a wide range of orientations (e.g., due to relatively rapid change in attitude of the mobile vehicle 102), such that the data associated with the step track cycle at 515 may not be suitable for determining an antenna platform offset for the spatial condition associated with the step track cycle. Also high velocity leads to higher tracking error. In some examples, the tracking error (e.g., servo error) or the standard deviation or variation in the azimuth and/or elevation directions may also be a criteria that determine the data is not suitable to be used, in which case the alignment calibration controller 275 may determine (e.g., at 525) whether the azimuth and elevation tracking error, standard deviation, or variation is below a corresponding threshold.

The velocity limit, tracking error, or axis position variation associated with 525 may be common with the step track cycle operations (e.g., velocity limit, tracking error, or axis position variation associated with a determination of a successful completion of a step track, as used in 520), or may be different velocity limit, tracking error, or axis position variation associated particularly with assessing the quality of alignment calibration procedure results for use in dynamic antenna platform offset calibration. In the example of method 500, the threshold velocity limit for both commanded azimuth angle and commanded elevation angle may be 2.5 degrees per second. The commanded azimuth and elevation velocities of the step track cycle 515 may be calculated, for example, as an average velocity or an RMS velocity (e.g., according to an RMS calculation of RMS AzVel=sqrt(sumVelSqAz/numSamples), where sumVelSqAz and numSamples were calculated during 515). If it is determined at 535 that the commanded azimuth and elevation velocities are not below the velocity limit, the method 500 may return to 505 (e.g., without recording the results of the step track procedure for the purpose of determining an antenna platform offset). If it is determined at 535 that the commanded azimuth and elevation velocities are below the velocity limit, the method 500 may proceed to 525.

At 530, the method 500 may include determining whether to store the result of the alignment calibration procedure for the purpose of determining an antenna platform offset. For example, at 530 the alignment calibration controller 275 may determine whether the azimuth bin associated with the step track cycle is empty, or if the current step track cycle is closer to a middle azimuth of the azimuth bin than a prior step track cycle. In the event that a bin is empty, the solution for the current step track cycle may fill the empty bin. In the event that a bin already has a step track cycle solution (e.g., a calibration vector set for the bin), the solution for the current step track cycle may replace a prior solution if the azimuth angle for the current step track cycle is closer to the middle azimuth angle of the associated bin, which may improve the spatial separation of the solution for the azimuth bin relative to the solution of adjacent azimuth bins. In another example, the result of an alignment calibration procedure may be stored so long as space is available in memory associated with the alignment calibration controller 275 (e.g., space in storage location 541), and if space is not available in the memory, the result of the current alignment calibration procedure may overwrite a previously saved result when it improves the spatial separation of the stored results and otherwise discarded. Alternatively, the solution for the current step track cycle may be ignored for the purpose of determining an antenna platform (e.g., deleted) if the azimuth angle for the current step track cycle is farther from the middle azimuth angle of the associated bin. Whether the solution for the current step track cycle is stored or not, the solution for the current step track cycle (e.g., an antenna pointing offset) may still be used for ongoing communications (e.g., until a subsequent antenna platform offset is determined).

Thus, a calibration vector set associated with a step track cycle anywhere in the azimuth bin may be accepted, but if a later solution is associated with an azimuth direction closer to the center position of the bin, or some other measure of improved spatial distribution, it will overwrite the earlier solution. This may support filling as many bins as possible, while also spreading the results of alignment calibration procedures as much as possible (e.g., avoiding including too many closely-spaced results near a particular spatial condition, thereby causing the calculated antenna platform offset to be skewed by those alignment calibration procedures performed near that particular spatial condition), which may be accomplished without significantly slowing the calibration process. Thus, if the azimuth bin is vacant, or if the azimuth direction associated with the step track cycle is close to the center of the azimuth bin, the method 500 may proceed to 535. Otherwise, the method 500 may return to 505 without recording the results of the step track procedure for the purpose of determining an antenna platform offset.

At 535, the method 500 may include storing the step track cycle solution. The step track cycle solution may be stored in a storage location 541 associated with the azimuth bin. In some examples the storage location 541 may be in non-volatile memory of the alignment calibration controller 275, so that solution is stored through power disruptions or through normal power cycles. This may, for example, permit the stitching together of step track solutions calculated over different travel segments of the mobile vehicle 102-*e* (e.g., flights of an aircraft), which may be beneficial because certain travel segments may not include antenna pointing across a sufficient range of azimuth directions.

In the example of method 500, the step track solution may include a calibration vector set including both the estimated aligned direction from the antenna 152-*e* to the target satellite 110-*e*, expressed in beam azimuth and elevation, and the peaked direction from the antenna 152-*e* to the target satellite 110-*e*, also expressed in beam azimuth and elevation. In other examples a calibration vector set may include different representations of a step track solution, including an estimated aligned direction from the antenna 152-*e* to the target satellite 110-*e* and an antenna pointing offset, the peaked direction from the antenna 152-*e* to the target satellite 110-*e* and an antenna pointing offset, simply the antenna pointing offset, or some other calculated parameter of combination of parameters. Further, although the described calibration vector set is described as having parameters in two dimensions, other methods in accordance with the present disclosure may have parameters in one dimension, or more than two dimensions.

Accordingly, in some examples, the method 500 may include performing a coordinate system transform at 540 prior to storing the step track results in storage location 541. For example, the step track solution may include an estimated aligned direction between the antenna 152 and the target satellite 110. In some examples, this may be initially calculated by the alignment calibration controller 275 as a North-East-Down vector in a global coordinate system (e.g., global reference frame 410 described with reference to FIG. 4). Accordingly, the estimated aligned direction may be transformed by the alignment calibration controller 275 into the mobile vehicle reference frame 420 with Eq. 1 and Eq. 2 described above, using the attitude of the mobile vehicle 102 (e.g., pitch $P_t$, roll $R_t$, and yaw $Y_t$, which may be provided by an IRU 280 described with reference to FIG. 2).

Further, in some examples, the estimated aligned direction may be transformed into the antenna reference frame 430 with Eq. 1 and Eq. 2 described above, using a previously entered or calculated antenna platform offset (e.g., pitch offset, roll offset, and yaw offset)

The representation of the unit vector for the estimated aligned direction of the beam 155-e and/or the unit vector for the peaked direction of the beam 155-e in the antenna reference frame 430-a may require three variables (e.g., one for each of the X"-axis, Y"-axis, and Z"-axis) for each of the unit vectors. But in some examples, the coordinate system transform at 540 may further convert the representation of unit vectors in the antenna reference frame 430 into two variables (e.g., elevation and azimuth directions, using Eq. 3), thereby reducing the number of variables stored in the storage location 541 by one third.

At 545, the method 500 may include determining whether the spatial conditions associated with calibration vector sets satisfy a spatial separation threshold. For example, at 545 the alignment calibration controller 275 may determine whether enough azimuth bins are filled. Satisfying the spatial separation threshold may improve the results of the antenna platform offset calibration, such that the associated matrices are well-conditioned and invertible without excessive errors. For example, at 545 the antenna controller may determine whether a step track solution has been determined for each of eight 45-degree azimuth bins.

In other methods in accordance with the present disclosure, different spatial separation thresholds may be applied at 545. For example, a spatial separation threshold may be satisfied when a calibration vector set has been determined for a subset of azimuth bins such as at least every other azimuth bin (e.g., when there are no adjacent azimuth bins that are not associated with a calibration vector set). Some examples may not use bins for satisfying a spatial separation criteria, and instead may have a maximum separation between spatial conditions associated with calibration vector sets. For example, a spatial separation threshold may be satisfied when a calibration vector set has been determined for a plurality of beam azimuth directions where no two adjacent beam azimuth directions are separated by more than 45 degrees. In such examples an antenna platform calibration offset may be calculated from vector calibration sets associated with as few as 8 different azimuth directions, but may be calculated from vector calibration sets associated with more than 8 different azimuth directions. Numerous other spatial separation thresholds may be used prior to determining an antenna alignment offset calibration.

If it is determined that the spatial separation criteria are satisfied (e.g., enough azimuth bins are filled), the method 500 may proceed to 550. Otherwise, the method 500 may return to 505 so that another step track cycle may be performed. Thus, the method 500 may include repeating the performance of an alignment calibration procedure (e.g., a step track cycle) until determining that the alignment calibration procedure has been performed for a set of spatial conditions (e.g., beam azimuth directions) that satisfy the spatial separation criteria (e.g., until all of the azimuth bins are filled). In various examples the subsequent step track cycles may be performed with the same target satellite 110, or with a different target satellite 110. In some cases a different target satellite 110 having a different orbital position may be selected in order to more rapidly fill different azimuth bins without requiring additional orientations of the mobile vehicle 102. However the different target satellites 110 may not support user data communication with the antenna system 150, so in some examples the same target satellite 110 may be used for subsequent step track cycles in order to maintain continuity of user data service.

At 550, the method 500 may include computing an antenna platform offset solution. For example, using the calibration vector sets stored in the azimuth bins of storage location 541, the yaw, pitch, and roll offset that minimizes the square of the error may be computed by the alignment calibration controller 275 using a method such as the pseudo-inverse single value decomposition technique described with reference to Eqs. 6 through 10, Procrustes method, or any other method for determining a minimum error of a transform between matrices. In some examples this may include converting the calibration vector sets from a representation in elevation and azimuth to a three-dimensional representation in respective reference frames. For example, an estimated aligned direction of the beam 155-e for each azimuth bin may be converted into coordinates in an X' axis, a Y' axis, and a Z' axis of the mobile vehicle reference frame 420-a (which may include a conversion using a previously-calculated antenna platform offset), and the peaked direction of the beam 155-e for each azimuth bin may be converted into coordinates in an X" axis, a Y" axis, and a Z" axis of the antenna reference frame 430-a. Each of the estimated aligned directions of the beam 155-e in the mobile vehicle reference frame 420-a may represent a row of a first matrix (e.g., $\overline{D}'$ of Eq. 6), and each of the peaked directions of the beam 155-e in the antenna reference frame 430-a may represent a row of a second matrix (e.g., $\overline{D}''$ of Eq. 6). Accordingly, the antenna platform offset may be calculated as the approximate transformation between the first matrix and the second matrix (e.g., calculating $\hat{T}$ of Eq. 8, an approximation of T of Eq. 6, to arrive at roll, pitch, and yaw offsets according to Eq. 10).

At 555, the method 500 may include the alignment calibration controller 275 determining whether a condition number of the antenna platform offset calibration is below a threshold condition number, where the condition number is the ratio of the largest versus the smallest non-zero singular value calculated from a singular value decomposition (e.g., a Jacobian singular value decomposition), or calculated as the norm of the matrix times the norm of the inverse of the matrix. The condition number may represent a measure of how "invertible" the solution of the singular value decomposition is, where a relatively high condition number may provide an indication that relatively small errors in the input variables would lead to relatively large errors in the results of the singular value decomposition. In one example, the threshold condition number may be 2.0. If the condition number of the antenna platform offset calibration is less than the threshold condition number, the method 500 may proceed to 560. If the condition number of the antenna platform offset calibration is not less than the threshold condition number, the method may return to 505 (which may include clearing the step track solution of one or more azimuth bins).

At 560, the method 500 may include the alignment calibration controller 275 determining whether residual values calculated with the antenna platform offset solution are within predetermined error bounds, where the residual values at 560 refer to a difference between the peaked direction of the beam 155-e and a newly estimated aligned direction of the beam 155-e that is determined based on the determined antenna platform offset. For example, the determined yaw, pitch, and roll offsets of the antenna platform offset may be used in a rotation matrix applied to the previously-estimated aligned direction of the beam 155-e (e.g., when a "zero" antenna platform offset was used to determine the previously-estimated aligned direction of the beam 155-e).

If the difference between the newly estimated aligned direction of the beam 155-e and the peaked direction of the beam 155-e is below the predetermined error bounds for all of the azimuth bins, the results from the alignment calibration procedures performed at each of the spatial conditions may be suitable for calculating the antenna platform offset, and the method 500 may proceed to 580. Otherwise the method 500 may proceed to 565. In one example of the method 500, the predetermined error bounds may include an azimuth limit of ±0.3° and an elevation limit of ±0.4°. In some examples the evaluations at 560 may include reference frame transformations such that these evaluations are made with reference to the global reference frame 410-a, rather than the antenna reference frame 430-a.

If the difference between the newly estimated aligned direction of the beam 155-e and the peaked direction of the beam 155-e is above the predetermined error bounds for a particular azimuth bin, the results of the alignment calibration procedure for that azimuth bin may not be suitable for use in calculating an antenna platform offset. Thus, for those azimuth bins that are associated with a difference between a newly-estimated direction of the beam 155-e and the peaked direction of the beam 155-e being above the predetermined error bounds, the bins may be cleared at 565. Upon clearing such azimuth bins, the method 500 may include incrementing an error counter stored in storage location 566 (e.g., non-volatile memory of the ACU 270-c), and the method 500 may proceed to 570. In some examples, if more than a threshold number of bins are cleared (e.g., three or more azimuth bins) all of the azimuth bins may be cleared, and the method may return to 505.

In some examples, the method 500 may also include determining elevation and azimuth offsets for the antenna system 150 (e.g., at 560). Elevation and azimuth offsets may be used, for example, to compensate for issues such as encoder offset (e.g., a motor home position not being set correctly), encoder drift, physical misalignment between components, physical deflection of components, and other issues that cause a difference between a commanded or sensed orientation of the beam 155 (e.g., as commanded to, or sensed by a positioner 153) and the actual orientation of the beam 155, as referenced to the antenna reference frame 430, but are not a pure rotation in the global reference frame. In accordance with one embodiment of the disclosed method and apparatus, it is desirable to account for such elevation and azimuth errors as well.

The determination of elevation and/or azimuth offsets may use the residual values calculated at 560 for determining whether the calculated residual values are within predetermined error bounds. For example, an elevation offset can be determined by taking the average difference in elevation between the peaked direction of the beam 155 for each step track solution and the newly determined estimated aligned direction of the beam 155 for the respective step track solution. Similarly, an azimuth offset can be determined by taking the average difference in azimuth between the peaked direction of the beam 155 for each step track solution and the newly determined estimated aligned direction of the beam 155 for the respective step track solution. In some examples the azimuth error may be further adjusted by way of secant correction to convert to a cross-elevation error, which may be associated with error in aperture coordinates. The determined elevation and/or azimuth offsets may subsequently be used to improve tracking of the beam 155 (e.g., by applying the determined elevation and/or azimuth offsets to commands of elevation and/or azimuth provided to a positioner 153).

At 570, the method 500 may include the alignment calibration controller 275 determining whether the error counter is greater than a threshold error limit (e.g., greater than 8), which may indicate ongoing difficulty in arriving at an antenna platform offset solution with well-conditioned calibration vector sets. If the error counter is not determined to be greater than the threshold error limit, the method 500 may proceed directly to 505 and perform another calibration cycle. If the error counter is determined to be greater than the threshold error limit, the method 500 may proceed to 575.

At 575, the method 500 may include clearing all of the azimuth bins in order to recalculate step track cycle solutions for each of the azimuth bins. At 575 the method 500 may also include clearing the error counter (e.g., resetting the error counter in storage location 566 to zero). Following the operations at 575 the method may proceed to 505 and perform another step track cycle.

At 580, the method 500 may include the alignment calibration controller 275 determining an updated antenna platform offset calibration. In some examples, such as when the antenna platform offset calculated at 550 is the first calculated antenna platform offset, the updated antenna platform offset of 580 may simply be equal to the antenna platform offset calculated at 550. In other examples, to allow continuous improvement, the antenna platform offset calculated at 550 may be combined with previously-calculated antenna platform offsets (e.g., by averaging, weighted averaging, or other combination), which may be retrieved from storage location 581 (e.g., non-volatile memory of the alignment calibration controller 275).

In some examples, it may be preferable to average the rotations of the antenna platform offsets after first converting each antenna platform offset to a quaternion, and averaging the quaternions. To convert the yaw, pitch, and roll offsets of an antenna platform offset to a quaternion rotation, the following equation may be used:

$$\begin{bmatrix} qw \\ qx \\ qy \\ qz \end{bmatrix} = \begin{bmatrix} \cos\left(\frac{\text{roll}}{2}\right) \cdot \cos\left(\frac{\text{pitch}}{2}\right) \cdot \cos\left(\frac{\text{yaw}}{2}\right) + \\ \sin\left(\frac{\text{roll}}{2}\right) \cdot \sin\left(\frac{\text{pitch}}{2}\right) \cdot \sin\left(\frac{\text{yaw}}{2}\right) \\ \sin\left(\frac{\text{roll}}{2}\right) \cdot \cos\left(\frac{\text{pitch}}{2}\right) \cdot \cos\left(\frac{\text{yaw}}{2}\right) - \\ \cos\left(\frac{\text{roll}}{2}\right) \cdot \sin\left(\frac{\text{pitch}}{2}\right) \cdot \sin\left(\frac{\text{yaw}}{2}\right) \\ \cos\left(\frac{\text{roll}}{2}\right) \cdot \sin\left(\frac{\text{pitch}}{2}\right) \cdot \cos\left(\frac{\text{yaw}}{2}\right) + \\ \sin\left(\frac{\text{roll}}{2}\right) \cdot \cos\left(\frac{\text{pitch}}{2}\right) \cdot \sin\left(\frac{\text{yaw}}{2}\right) \\ \cos\left(\frac{\text{roll}}{2}\right) \cdot \cos\left(\frac{\text{pitch}}{2}\right) \cdot \sin\left(\frac{\text{yaw}}{2}\right) - \\ \sin\left(\frac{\text{roll}}{2}\right) \cdot \sin\left(\frac{\text{pitch}}{2}\right) \cdot \cos\left(\frac{\text{yaw}}{2}\right) \end{bmatrix} \quad (11)$$

Subsequently, each of the four components of the quaternion (qw, qx, qy, and qz) may be averaged individually, qw old with qw new, etc. To support a weighted averaging, the number of successful calibrations is stored (e.g., in storage location 581) and is incremented by 1 after this successful calibration. After the antenna platform offset calculated at 550 is found to be acceptable, an example of instructions for performing a weighted quaternion averaging may include the following:

```
Cal_counter++newWeight=1.0/Cal_counter if newWeight<min_weight then
    newWeight=newWeight
    rotation=newRotation*newWeight+rotation*
        (1.0−newWeight)                          (12)
``` where min_weight represents a minimum weighting to give the weighted averaging some forgetfulness, such that if there is a physical change in antenna platform misalignment and the calibration is not otherwise reset, the weighted averaging is able to adapt more quickly. Otherwise, if the system had already recorded numerous calibrations, an unnecessarily large number of new antenna platform offset calibrations may be required to adapt to the physical change in antenna platform misalignment.

After the quaternion has been averaged it may be converted to a unit vector (e.g., by dividing the quaternion elements by the magnitude of the quaternion) since such averaging may produce a quaternion that is not quite a unit. The quaternions may be converted back to roll, pitch, and yaw offsets using the following equation:

$$\begin{bmatrix} roll \\ pitch \\ yaw \end{bmatrix} = \begin{bmatrix} \arctan\left(\frac{2(qw \cdot qx + qy \cdot qz)}{1 - 2(qx^2 + qy^2)}\right) \\ \arcsin(2(qw \cdot qy - qz \cdot qx)) \\ \arctan\left(\frac{2(qw \cdot qz + qx \cdot qy)}{1 - 2(qy^2 + qz^2)}\right) \end{bmatrix} \quad (13)$$

At 585, the method 500 may include the alignment calibration controller 275 setting the calibration status to "calibrated," (e.g., updating the status from "calibrating" to "calibrated," or maintaining a status of "calibrated") which may result in a change in periodicity for subsequent alignment calibration procedures (e.g., as determined by a wait time such as wait times of 510 or 511). In some examples, updating the calibration status to "calibrated" may cause alignment calibration procedures to be performed according to a longer periodicity, such that reduction in signal strength or communications capacity associated with the misaligned beam directions of the alignment calibration procedures may be reduced. At 585, the method 500 may also include the alignment calibration controller 275 clearing the azimuth bins and error count, such that another antenna alignment offset calibration may be computed (e.g., at 550) using new step track cycle solutions. Following the operations of 585, the method 500 may return to 505 and begin another calibration cycle.

Various other operations that are not shown may also be included in the method 500 to address particular circumstances. For example, to reset the antenna platform offset calibration for reinstallation of an antenna system, or portion thereof, all values of antenna platform offset calibrations and/or step track solutions may be deleted. In some examples, this may include applying a "zero" antenna platform offset calibration, or trigger a request to enter a manual antenna platform offset calibration. In various examples, resetting the antenna platform offset calibration may be performed by an operator (e.g., executing a reset command), or may be triggered based on a detected removal or disconnection of the antenna system 150, a portion thereof, or disconnection of some other component (e.g., disconnecting a wiring harness associated with the antenna system 150, or disconnecting a wiring harness associated with an IRU of the mobile vehicle 102).

Figure 6:
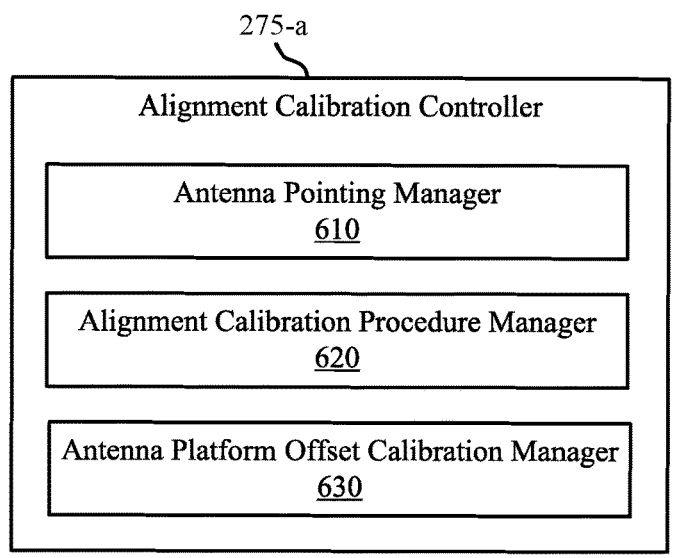
FIG. 6 illustrates a block diagram of an apparatus that supports dynamic antenna platform offset calibration in accordance with aspects of the present disclosure.

FIG. 6 shows a block diagram 600 of an example of an alignment calibration controller 275-*a* that supports dynamic antenna platform offset calibration in accordance with aspects of the present disclosure. The alignment calibration controller 275-*a* may be an example of aspects of the alignment calibration controllers 275 described with reference to FIGS. 1 through 5. In various examples, the alignment calibration controller 275-*a* may be a stand-alone component of an antenna system 150, may be integrated in another component of an antenna system 150 (e.g., integrated in an ACU 270 and/or integrated in a modem 230), or may be distributed across more than one component of an antenna system 150. The alignment calibration controller 275-*a* may include an antenna pointing manager 610, an alignment calibration procedure manager, and an antenna platform offset calibration manager 630. Each of these components may be in communication with one another (e.g., via one or more signals or buses).

The components of the alignment calibration controller 275-*a* may individually or collectively be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

The antenna pointing manager 610 may manage aspects of pointing a beam 155 (e.g., directing aspects of, or providing positioning information to an ACU 270). For example, the antenna pointing manager 610 may support pointing the beam 155 of the antenna 152 towards a target satellite 110 for communication of user data based at least in part on the positional information of a mobile vehicle 102 and antenna pointing offset (e.g., as determined by the alignment calibration procedure manager 620) in a first tracking mode or a second tracking mode, as described herein. In some examples, the antenna pointing manager 610 may further support pointing the beam 155 of the antenna 152 towards a target satellite 110 for communication of user data based at least in part on an antenna platform offset (e.g., as determined by the antenna platform offset calibration manager 630) in a second tracking mode, as described herein.

The alignment calibration procedure manager 620 may manage various aspects of performing an alignment calibration procedure. For example, the alignment calibration procedure manager may direct aspects of performing an alignment calibration procedure to determine an antenna pointing offset based at least in part on a difference between an estimated pointing direction from the antenna 152 to the target satellite 110 that is determined based at least in part on positional information of the mobile vehicle 102 and a peaked pointing direction from the antenna 152 to the target satellite 110 that is determined based at least in part on a measured signal characteristic of first user data communicated during the alignment calibration procedure.

To support dynamic antenna platform offset calibration, the alignment calibration procedure manager 620 may direct alignment calibration procedures to the same target satellite 110, or a plurality of target satellites 110. Further, the alignment calibration procedure manager 620 may direct alignment calibration procedures to include transmitting signals from the antenna 152, receiving signals at the antenna 152, or a combination thereof. In some examples the alignment calibration procedure manager 620 may provide antenna pointing offsets associated with alignment calibration procedures to the antenna pointing manager 610 to support pointing of the beam 155 along misaligned directions.

The antenna platform offset calibration manager 630 may manage various aspects of determining an antenna platform offset. For example, the antenna platform offset calibration manager 630 may cause the alignment calibration procedure manager 620 to repeat performing the alignment calibration procedure until determining that the alignment calibration procedure has been performed for a plurality of spatial conditions that satisfy a spatial separation criteria. In one example, each of the plurality of spatial conditions includes an angular direction within one of a plurality of angular ranges, and determining that the alignment calibration procedure has been performed for the plurality of spatial conditions that satisfy the spatial separation criteria includes determining that a number of angular ranges of antenna azimuth direction associated with the plurality of spatial conditions satisfies a threshold number of angular ranges of antenna azimuth direction. In another example, determining that the alignment calibration procedure has been performed for the plurality of spatial conditions that satisfy the spatial separation criteria may include determining that a maximum angular separation between adjacent pairs of the plurality of spatial conditions is less than or equal to a threshold angular separation.

In some examples the antenna platform offset calibration manager 630 may determine, for each of the calibration procedures performed for the plurality of spatial conditions, a respective calibration vector set (e.g., the estimated pointing direction from the antenna to the target satellite, the peaked pointing direction from the antenna to the target satellite, or both) based at least in part on the respective peaked pointing direction associated with the respective one of the plurality of spatial conditions. In some examples, determining a respective calibration vector set is based at least in part on an angular rate of pointing for the antenna being below a threshold angular rate, a residual error being below a threshold residual error, a servo error being below a servo error threshold, or a combination thereof.

In some examples, determining a respective calibration vector set is based at least in part on identifying that a fitness metric associated with a new antenna calibration procedure taken at a new spatial condition within one of the plurality of angular ranges associated with a previously determined calibration vector set exceeds the fitness metric associated with the previously determined calibration vector set, and replacing the previously determined calibration vector set with a new calibration vector set determined from the new antenna calibration procedure. For example, a fitness metric may include a relationship of the new spatial condition to a nominal direction of the one of the plurality of angular ranges, a quality metric associated with the new antenna calibration procedure, or a combination thereof.

After determining that the alignment calibration procedure has been performed for the plurality of spatial conditions that satisfy the spatial separation criteria, the antenna platform offset calibration manager 630 may determine an antenna platform offset between a reference frame of the antenna and a reference frame of the mobile vehicle based at least in part on the calibration vector sets determined for each of the calibration procedures performed for the plurality of spatial conditions.

In some examples, determining the antenna platform offset is based at least in part on the antenna platform offset satisfying an offset calibration quality criteria, and the offset calibration quality criteria may include a calculated matrix condition number for the antenna platform offset being below a threshold matrix condition number or residuals associated with the determined antenna platform offset for each of the plurality of spatial conditions being below a threshold.

In some examples, the antenna platform offset calibration manager 630 may determine that a residual based at least in part on the calculated antenna platform offset is above a threshold residual for at least one of a plurality of spatial conditions, and discard calibration vector set for each of the at least one of the plurality of spatial conditions. The antenna platform offset calibration manager 630 may subsequently determining a new calibration vector set for each of the at least one of the plurality of spatial conditions.

In some examples, the antenna platform offset calibration manager 630 may determine an updated antenna platform offset, which may be an initial antenna platform offset (e.g., replacing a "zero" or manual calibration), or may be a refined antenna platform offset based at least in part on one or more previously-calculated antenna platform offsets. For example, the antenna platform offset calibration manager 630 may calculate a weighted average of a plurality of calculated antenna platform offsets.

Figure 7:
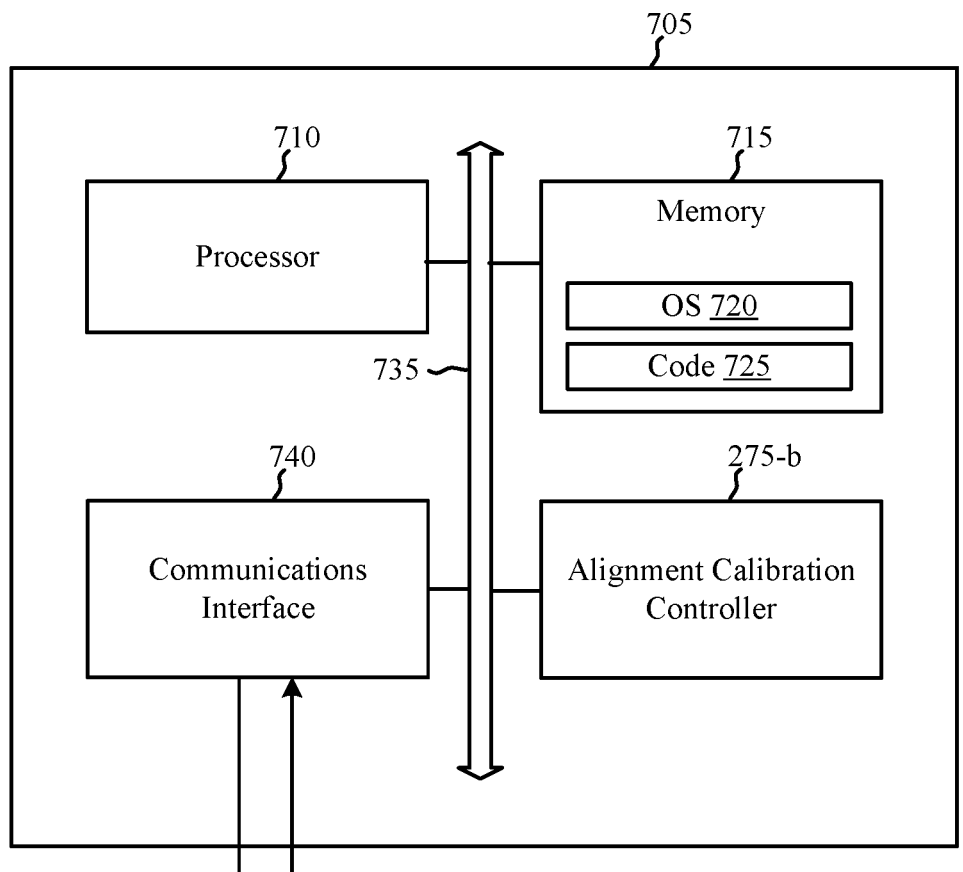
FIG. 7 illustrates a block diagram of an apparatus that supports dynamic antenna platform offset calibration in accordance with aspects of the present disclosure.

FIG. 7 illustrates a block diagram 700 of an apparatus 705 that supports dynamic antenna platform offset calibration in accordance with aspects of the present disclosure. The apparatus 705 includes a processor 710, memory 715, an alignment calibration controller 275-b, and a communications interface 740. Each of these components may be in communication with each other, directly or indirectly, over one or more buses 735. In various examples, the apparatus 705 may be, or be part of an antenna system 150 described with reference to FIGS. 1 through 5.

The memory 715 may include random access memory (RAM) and/or read-only memory (ROM). The memory 715 may store an operating system (OS) 720 (e.g., built on a Linux or Windows kernel). The memory 715 may also store computer-readable, computer-executable code 725 including instructions that are configured to, when executed, cause the processor 710 to perform various functions described herein related dynamic antenna platform offset calibration. Alternatively, the code 725 may not be directly executable by the processor 710 but be configured to cause the apparatus 705 (e.g., when compiled and executed) to perform one or more of the functions described herein. In some examples, the memory 715 may also include storage locations associated with the alignment calibration controller 275-b for various operations described herein (e.g., storage locations 541, 577, and 581 described with reference to FIG. 5). The communications interface 740 may transmit signals or receive signals communicated with other components of the antenna system 150.

The alignment calibration controller 275-b may be an example of the alignment calibration controllers 275 described with reference to FIGS. 1 through 6. The apparatus 705, including the alignment calibration controller 275-b, may manage one or more aspects of dynamic antenna platform offset calibration, as described herein. In some examples the alignment calibration controller 275-b may support an antenna system 150 communicating, at a mobile vehicle 102 according to a first tracking mode during one or more travel segments of the mobile vehicle 102, first user data with a target satellite 110 via a beam 155 of an antenna 152 mounted to the mobile vehicle 102. As directed by the alignment calibration controller 275-b, communicating the first user data according to the first tracking mode may include performing an alignment calibration procedure to determine an antenna pointing offset based at least in part on a difference between an estimated pointing direction from the antenna 152 to the target satellite 110 that is determined based at least in part on positional information of the mobile vehicle 102, and a peaked pointing direction from the antenna 152 to the target satellite 110 that is determined based at least in part on a measured signal characteristic of the first user data communicated during the alignment calibration procedure. The alignment calibration controller 275-b may subsequently direct (e.g., via a command or updated antenna positioning offsets provided to an ACU 270) pointing the beam 155 of the antenna 152 towards the target satellite 110 for subsequent communication of the first user data based at least in part on the positional information of the mobile vehicle 102 and the determined antenna pointing offset.

In accordance with the methods described herein, the alignment calibration controller 275-b may repeat the alignment calibration procedure until determining that the alignment calibration procedure has been performed for a plurality of spatial conditions that satisfy a spatial separation criteria. The alignment calibration controller 275-b may subsequently determine, for each of the calibration procedures performed for the plurality of spatial conditions, a respective calibration vector set based at least in part on the respective peaked pointing direction associated with the respective one of the plurality of spatial conditions. Based at least in part on determining that the alignment calibration procedure has been performed for the plurality of spatial conditions that satisfy the spatial separation criteria, the alignment calibration controller 275-b may determine an antenna platform offset between a reference frame of the antenna 152 (e.g., an antenna reference frame 430) and a reference frame of the mobile vehicle 102 (e.g., a mobile vehicle reference frame 420) based at least in part on the calibration vector sets determined for each of the alignment calibration procedures performed for the plurality of spatial conditions.

Subsequent to determining of the antenna platform offset, the alignment calibration controller 275-b may direct communication of second user data with the target satellite 110 via the beam 155 of the antenna 152 according to a second tracking mode, wherein communicating the second user data according to the second tracking mode includes pointing the beam 155 of the antenna 152 towards the target satellite 110 for communicating the second user data based at least in part on the positional information of the mobile vehicle 102 and the determined antenna platform offset (e.g., as provided to an ACU 270).

The apparatus 705, including the processor 710, the memory 715, the alignment calibration controller 275-b and/or the communications interface 740 may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. The apparatus 705 may also be implemented as a combination of computing devices, e.g., a combination of a DSP and a microprocessor, multiple microprocessors, one or more microprocessors in conjunction with a DSP core, integrated memory, discrete memory, or any other such configuration The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical positions. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method, comprising:
   communicating via an antenna;
   determining a plurality of peaked pointing directions from the antenna to a target device based at least in part on measured signal characteristics associated with the communicating, wherein each of the peaked pointing directions is associated with a respective spatial condition;
   determining, after determining the plurality of peaked pointing directions, that a set of the respective spatial conditions satisfies a spatial separation criteria;
   determining an offset between a first reference frame of the antenna and a second reference frame that is external to the antenna based at least in part on the peaked pointing directions corresponding to the set of the respective spatial conditions; and
   communicating via the antenna based at least in part on the determined offset.

2. The method of claim 1, further comprising:
   determining, for each of the respective spatial conditions, a respective antenna pointing offset based at least in part on a difference between an estimated pointing direction from the antenna to the target device and the corresponding peaked pointing direction, wherein determining the offset is based at least in part on the determined antenna pointing offsets.

3. The method of claim 2, further comprising:
   determining, for each of the respective spatial conditions, a relative location of the target device from the antenna, wherein the estimated pointing direction is determined based at least in part on the relative location.

4. The method of claim 1, wherein determining that the set of the respective spatial conditions satisfies the spatial separation criteria comprises:
   determining that angular separation between adjacent pairs of the set of respective spatial conditions is less than or equal to a threshold.

5. The method of claim 1, wherein determining that the set of the respective spatial conditions satisfies the spatial separation criteria comprises:
   determining that a quantity of angular ranges of antenna azimuth direction associated with the set of the respective spatial conditions satisfies a threshold.

6. The method of claim 1, wherein determining that the set of the respective spatial conditions satisfies the spatial separation criteria comprises:
   selecting a peaked pointing direction from the plurality of peaked pointing directions for determining the offset based at least in part on a fitness metric of the respective spatial condition corresponding to the selected peak pointing direction.

7. The method of claim 1, wherein the second reference frame is associated with an inertial reference frame of a vehicle.

8. The method of claim 1, wherein determining the plurality of peaked pointing directions is based at least in part on a requested user data rate.

9. The method of claim 1, wherein the target device for determining one of the plurality of peaked pointing directions is different than the target device for determining another of the plurality of peaked pointing directions.

10. The method of claim 1, wherein determining the offset is based at least in part on satisfying an offset calibration quality criteria.

11. The method of claim 1, wherein the measured signal characteristics are based at least in part on user data signals.

12. An apparatus, comprising:
    a processor;
    memory in electronic communication with the processor; and
    instructions stored in the memory and executable by the processor to cause the apparatus to:
      communicate via an antenna;
      determine a plurality of peaked pointing directions from the antenna to a target device based at least in part on measured signal characteristics associated with the communicating, wherein each of the peaked pointing directions is associated with a respective spatial condition;
      determine, after determining the plurality of peaked pointing directions, that a set of the respective spatial conditions satisfies a spatial separation criteria;
      determine an offset between a first reference frame of the antenna and a second reference frame that is external to the antenna based at least in part on the peaked pointing directions corresponding to the set of the respective spatial conditions; and communicate via the antenna based at least in part on the determined offset.

13. The apparatus of claim 12, wherein the instructions are executable by the processor to cause the apparatus to determine the measured signal characteristics based at least in part on user data signals communicated via the antenna.

14. The apparatus of claim 12, wherein the instructions to cause the apparatus to determine the plurality of peaked pointing directions are based at least in part on a requested data rate associated with the communication via the antenna.

15. A system, comprising:
an antenna;
a modem coupled to the antenna and operable to process signals communicated via the antenna;
a positioner for positioning a beam of the antenna based at least in part on positioning control information; and
an alignment calibration controller configured to:
  determine a plurality of peaked pointing directions from the antenna to a target device based at least in part on measured signal characteristics associated with communication with the target device, wherein each of the peaked pointing directions is associated with a respective spatial condition;
  determine, after determining the plurality of peaked pointing directions, that a set of the respective spatial conditions satisfies a spatial separation criteria;
  determine an offset between a first reference frame of the antenna and a second reference frame that is external to the antenna based at least in part on the peaked pointing directions corresponding to the set of the respective spatial conditions; and
  control the positioner to position the antenna, for communications via the antenna, based at least in part on the determined offset.

16. The system of claim 15, wherein the positioner comprises a pointing mechanism configured to physically position the beam of the antenna in response to the positioning control information.

17. The system of claim 15, wherein the positioner comprises an electronic beamformer configured to steer the beam of the antenna in response to the positioning control information.

18. The system of claim 15, wherein the alignment calibration controller is configured to determine the offset based at least in part on an offset calibration quality criteria.

19. The system of claim 15, wherein the alignment calibration controller is configured to determine that the set of the respective spatial conditions satisfies the spatial separation criteria based at least in part on determining that angular separation between adjacent pairs of the spatial conditions is less than or equal to a threshold.

20. The system of claim 15, wherein the alignment calibration controller is configured to determine that the set of the respective spatial conditions satisfies the spatial separation criteria based at least in part on determining that a number of angular ranges of antenna azimuth direction associated with the spatial conditions satisfies a threshold.

* * * * *